(12) United States Patent
Barber et al.

(10) Patent No.: US 12,253,632 B2
(45) Date of Patent: Mar. 18, 2025

(54) SYSTEMS AND METHODS FOR PULSED-WAVE LIDAR

(71) Applicant: Aurora Operations, Inc., Mountain View, CA (US)

(72) Inventors: Zeb Barber, Mountain View, CA (US); Randy Reibel, Mountain View, CA (US); Devlin Baker, Mountain View, CA (US); Emil Kadlec, Mountain View, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 348 days.

(21) Appl. No.: 17/870,566

(22) Filed: Jul. 21, 2022

(65) Prior Publication Data

US 2022/0390561 A1   Dec. 8, 2022

Related U.S. Application Data

(63) Continuation of application No. 17/329,413, filed on May 25, 2021, now Pat. No. 11,428,789, which is a
(Continued)

(51) Int. Cl.
*G01S 7/484*      (2006.01)
*G01S 7/481*      (2006.01)
(Continued)

(52) U.S. Cl.
CPC ............ *G01S 7/484* (2013.01); *G01S 7/4814* (2013.01); *G01S 17/26* (2020.01); *G01S 17/34* (2020.01);
(Continued)

(58) Field of Classification Search
None
See application file for complete search history.

(56) References Cited

U.S. PATENT DOCUMENTS 10,802,120 B1 *  10/2020  LaChapelle .......... G01S 7/4917
11,029,395 B1    6/2021   Barber et al.
(Continued)

FOREIGN PATENT DOCUMENTS

JP    2006-510012 A    3/2006
JP    2013-500583 A    1/2013
(Continued)

OTHER PUBLICATIONS

Korean Office Action issued in connection with KR Appl. Ser. No. 10-2022-7041343 dated Jan. 30, 2023 (18 pages).
(Continued)

*Primary Examiner* — Luke D Ratcliffe
(74) *Attorney, Agent, or Firm* — FOLEY & LARDNER LLP

(57) ABSTRACT

In some implementations, a light detection and ranging (LIDAR) system includes a laser source configured to provide an optical signal at a first signal power, an amplifier having a plurality of gain levels, at which the amplifier is configured to amplify the optical signal, and one or more processors. The one or more processors are configured to, based on the first signal power and a duty cycle of the optical signal, vary a gain level of the amplifier from the plurality of gain levels to generate a pulse signal, transmit the pulse signal from the amplifier to an environment, receive a reflected signal that is reflected from an object, responsive to transmitting the pulse signal, and determine a range to the object based on an electrical signal associated with the reflected signal.

18 Claims, 16 Drawing Sheets

Related U.S. Application Data continuation of application No. 16/917,297, filed on Jun. 30, 2020, now Pat. No. 11,029,395.

(51) Int. Cl.
| | | |
|---|---|---|
| *G01S 17/26* | (2020.01) | |
| *G01S 17/34* | (2020.01) | |
| *G01S 17/58* | (2006.01) | |
| *G01S 17/931* | (2020.01) | |
| *G05D 1/00* | (2024.01) | |

(52) U.S. Cl.
CPC ............ *G01S 17/58* (2013.01); *G01S 17/931* (2020.01); *G05D 1/0231* (2013.01)

(56) References Cited

U.S. PATENT DOCUMENTS

| | | | |
|---|---|---|---|
| 11,428,789 | B2 * | 8/2022 | Barber .................... G01S 7/484 |
| 2015/0109605 | A1 | 4/2015 | Major et al. |
| 2017/0153319 | A1 | 6/2017 | Villeneuve et al. |
| 2017/0155225 | A1 | 6/2017 | Villeneuve et al. |
| 2017/0201059 | A1 * | 7/2017 | Villeneuve ............ G01S 7/4873 |
| 2017/0299697 | A1 | 10/2017 | Swanson |
| 2018/0120433 | A1 * | 5/2018 | Eichenholz ............. G01S 17/26 |
| 2018/0284279 | A1 | 10/2018 | Campbell et al. |
| 2018/0299534 | A1 | 10/2018 | Lachapelle et al. |
| 2018/0306926 | A1 | 10/2018 | Lachapelle et al. |

FOREIGN PATENT DOCUMENTS

| | | | |
|---|---|---|---|
| JP | 2017-211502 | A | 11/2017 |
| JP | 2018-535438 | A | 11/2018 |
| JP | 2020-505585 | A | 2/2020 |
| KR | 2005-0031476 | A | 4/2005 |
| KR | 2012-0013597 | A | 2/2012 |
| KR | 10-2018-0083983 | A | 7/2018 |
| KR | 2018-0083983 | A | 7/2018 |
| KR | 2019-0093893 | A | 8/2019 |
| WO | WO-2018/107237 | A1 | 6/2018 |
| WO | WO-2019/064750 | A1 | 4/2019 |

OTHER PUBLICATIONS

Japanese Office Action issued in connection with JP Appl. Ser. No. 2022-573254 dated May 30, 2023.

Korean Office Action issued in connection with KR Appl. Ser. No. 10-2023-7009438 dated Jul. 7, 2023.

Office Action issued in connection with Korean Appl. No. 10-2024-7002539 dated Feb. 15, 2024.

Extended European Search Report issued in connection with EP Appl. No. 21832324.4 dated Aug. 24, 2023.

Office Action issued in connection with Japanese Appl. No. 2024-008945 dated Aug. 27, 2024.

* cited by examiner

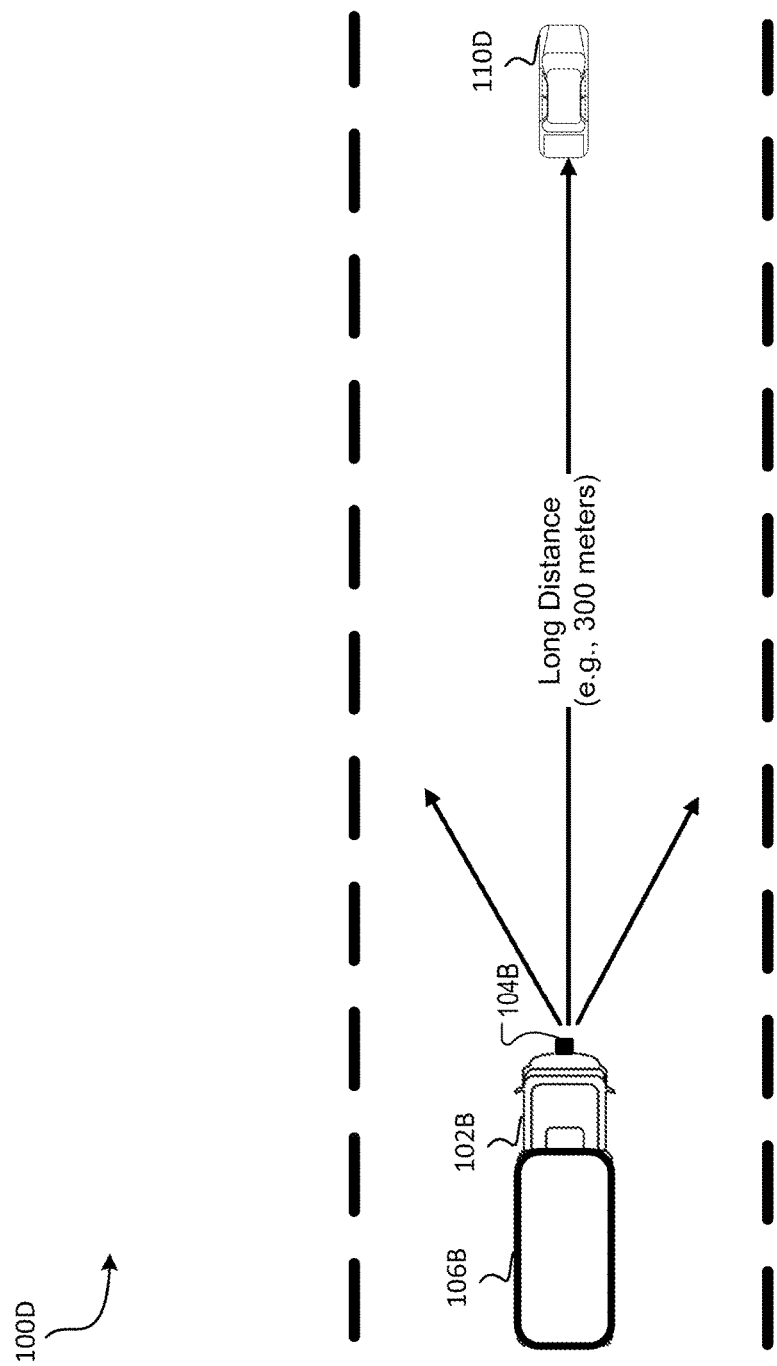

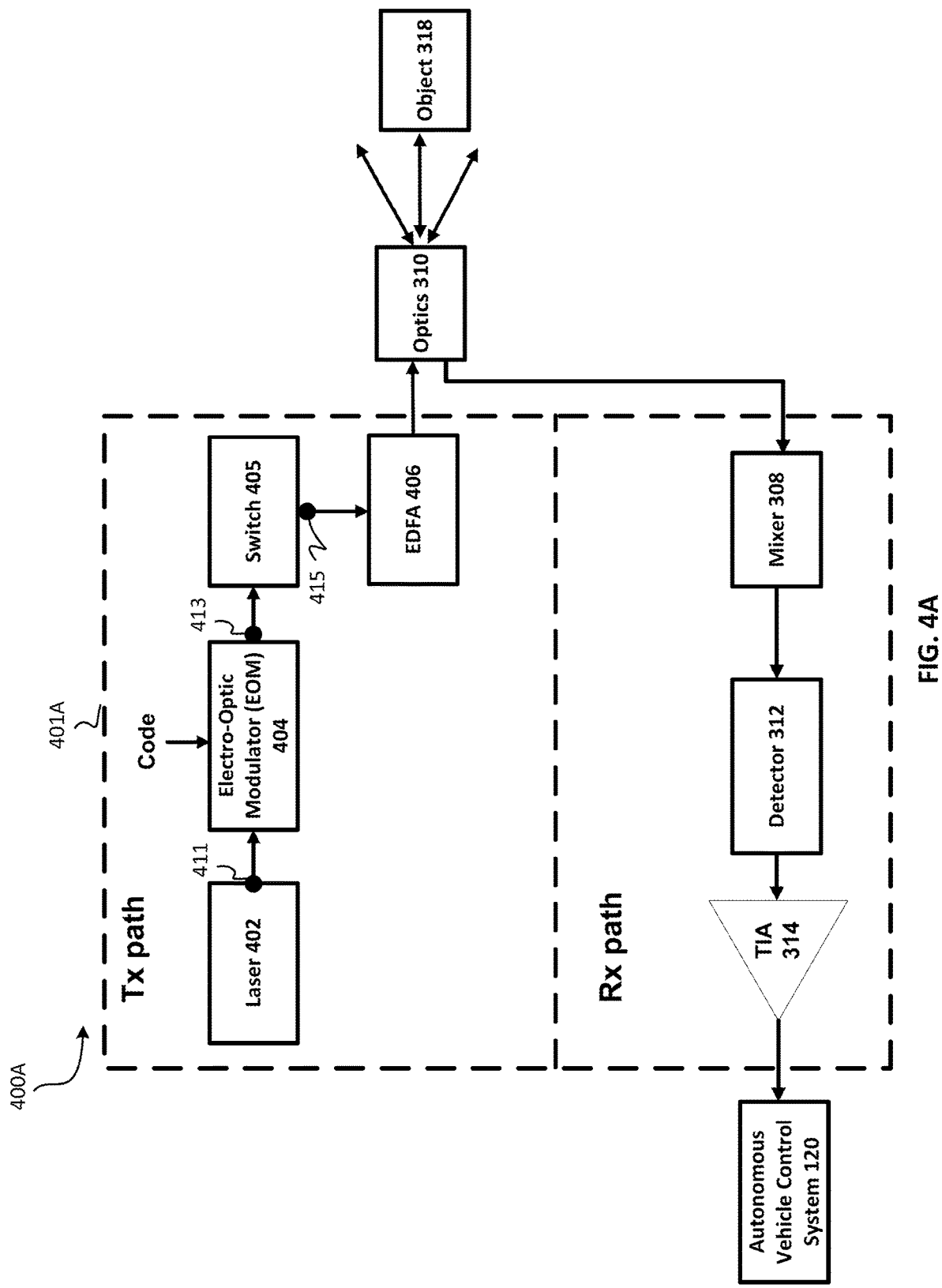

SYSTEMS AND METHODS FOR PULSED-WAVE LIDAR

CROSS-REFERENCE TO RELATED APPLICATIONS

This application is a continuation of U.S. patent application Ser. No. 17/329,413, filed on May 25, 2021, which claims the benefit of and priority to U.S. patent application Ser. No. 16/917,297, filed Jun. 30, 2020. The entire disclosure of U.S. patent application Ser. No. 16/917,297 and U.S. patent application Ser. No. 17/329,413 is incorporated herein by reference.

BACKGROUND

Optical detection of range using lasers, often referenced by a mnemonic, LIDAR, for light detection and ranging, also sometimes called laser RADAR, is used for a variety of applications, from altimetry, to imaging, to collision avoidance. LIDAR provides finer scale range resolution with smaller beam sizes than conventional microwave ranging systems, such as radio-wave detection and ranging (RADAR). Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

SUMMARY

Aspects of the present disclosure relate generally to light detection and ranging (LIDAR) in the field of optics, and more particularly to systems and methods for pulsed-wave LIDAR to support the operation of a vehicle.

One implementation disclosed here is directed to a LIDAR system. The LIDAR system includes a laser source configured to provide an optical signal. In some implementations, the LIDAR system includes an amplifier (e.g., an erbium doped fiber amplifier (EDFA) or a semiconductor optical amplifier (SOA)) having a plurality of gain configurations, wherein the amplifier is configured to receive the optical signal, and amplify the optical signal based on a gain configuration of the plurality of gain configurations. In some implementations, the LIDAR system includes one or more processors configured to adjust the gain configuration of the amplifier across two or more of the plurality of gain configurations to cause the amplifier to generate an amplified signal corresponding to a pulse envelope signal.

In another aspect, the present disclosure is directed to a LIDAR system. The LIDAR system includes a laser source configured to provide an optical signal. In some implementations, the LIDAR system includes an optical switch having a first terminal, a second terminal, and a switch mode. In some implementations, the optical switch is configured to receive the optical signal at the first terminal; responsive to the optical switch being configured in the first mode, allow a transmission of the optical signal from the first terminal to the second terminal, responsive to the optical switch being configured in the second mode, block the transmission of the optical signal to the second terminal. In some implementations, the LIDAR system includes one or more processors configured to change the optical switch mode between the first mode and the second mode to cause the optical switch to generate a pulse envelope signal.

In another aspect, the present disclosure is directed to a LIDAR system. The LIDAR system includes a laser source configured to provide an optical signal. In some implementations, the LIDAR system includes a pulse envelope generator configured to generate a pulse envelope signal by determining a relative phase difference between a first optical signal associated with the optical signal and a second optical signal associated with the optical signal, or modulating the light signal using an electrical field. In some implementations, the LIDAR system includes an amplifier configured to amplify the pulse envelope signal and transmit the amplified pulse envelope signal via one or more optical elements.

In another aspect, the present disclosure is directed to a method for pulsed-wave LIDAR to support the operation of a vehicle. In some implementations, the method includes modulating an optical signal to generate a modulated optical signal. In some implementations, the method includes selecting a plurality of pulses from the modulated optical signal to generate a pulsed envelope signal. In some implementations, the method includes transmitting the pulsed envelope signal via one or more optical elements. In some implementations, the method includes receiving a reflected signal responsive to transmitting the pulsed envelope signal. In some implementations, the method includes determining a range to an object based on an electrical signal associated with the reflected signal.

Still other aspects, features, and advantages are readily apparent from the following detailed description, simply by illustrating a number of particular implementations, including the best mode contemplated for carrying out the invention. Other implementations are also capable of other and different features and advantages, and their several details can be modified in various obvious respects, all without departing from the spirit and scope of the invention. Accordingly, the drawings and description are to be regarded as illustrative in nature, and not as restrictive.

BRIEF DESCRIPTION OF THE FIGURES

Implementations are illustrated by way of example, and not by way of limitation, in the figures of the accompanying drawings in which like reference numerals refer to similar elements and in which:

FIG. 1D is a block diagram illustrating an example of a system environment for autonomous commercial trucking vehicles, according to some implementations;

FIG. 4A is a block diagram illustrating an example environment of a LIDAR system in pulsed-wave operation using an optical switch for operating an autonomous vehicle, according to some implementations;

DETAILED DESCRIPTION

Figure 1A:
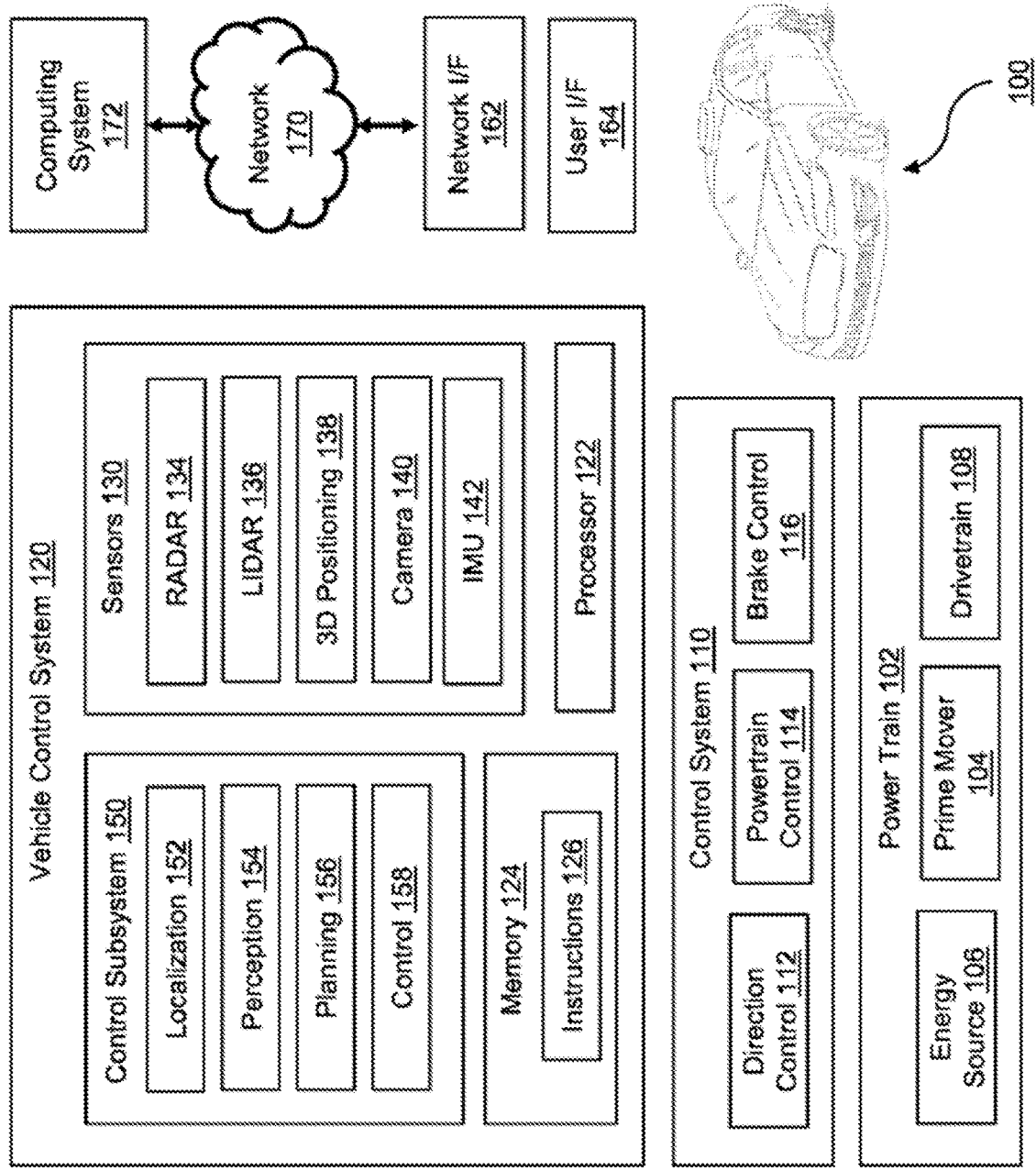
FIG. 1A is a block diagram illustrating an example of a system environment for autonomous vehicles according to some implementations.

A LIDAR system may include a transmit (Tx) path and a receive (Rx) path. The transmit (Tx) path may include a laser source for providing a light signal (sometimes referred to as, "beam") that is derived from (or associated with) a local oscillator (LO) signal, one or more modulators for modulating a phase and/or a frequency of the light signal using Continuous Wave (CW) modulation or quasi-CW modulation, and an amplifier for amplifying the modulated signal before sending the signal to optics (e.g., an oscillatory scanner, a unidirectional scanner, a Risley prism, a circulator optic, and/or a beam collimator, etc.).

The optics are configured to steer the amplified signal that it receives from the Tx path into an environment within a given field of view toward an object, receive a returned signal reflected back from the object, and provide the returned signal to the receive (Rx) path.

The Rx path may include a mixer (e.g., 50/50) for mixing the LO signal with the returned signal to generate a down-converted signal, and a transimpedance (TIA) amplifier for amplifying the down-converted signal. The Rx path provides the down-converted signal (now amplified) to one or more processors for determining a distance to the object and/or measuring the velocity of the object.

Operating an autonomous vehicle poses significant challenges for the conventional LIDAR system. First, the LIDAR system should be able to detect objects (e.g., street signs, people, cars, trucks, etc.) at short distances (e.g., less than 150 meters) and long distances (e.g., 300 meters and beyond). Detecting objects at long distances, however, is not an easy feat for the conventional LIDAR system. Namely, the amplifiers of the conventional LIDAR system do not have enough power to amplify the transmitted light signal enough for it to reach a long-distance object. Second, the beam scanning techniques used by conventional LIDAR systems often produce long measurement times, which in turn, require for the LIDAR system to meet a tighter and difficult speckle processing requirements.

Accordingly, the present disclosure is directed to systems and methods for pulsed-wave LIDAR to support the operation of a vehicle.

In general, as described in the below passages, an implementation of a pulsed-wave LIDAR system may be achieved by varying a gain configuration on an EDFA across a plurality of gain configurations of the EDFA. For example, the LIDAR system may include a laser source configured to provide an optical signal; an erbium doped fiber amplifier (EDFA) that has a plurality of gain configurations, where the EDFA is configured to receive the optical signal, and amplify the optical signal based on a gain configuration of the plurality of gain configurations; and one or more processors (e.g., autonomous vehicle control system 120, computing system 172, etc.) that are configured to adjust the gain configuration of the EDFA across at least a subset of the plurality of gain configurations to cause the EDFA to generate an amplified signal corresponding to a pulse envelope signal.

Another implementation of a pulsed-wave LIDAR system may be achieved by toggling an optical switch. For example, the pulsed-wave LIDAR system may include a laser source configured to provide an optical signal; an optical switch having a first terminal, a second terminal, and a switch mode, where the optical switch is configured to receive the optical signal at the first terminal; and either allow a transmission of the optical signal from the first terminal to the second terminal if the switch mode is configured in a first mode, or block the transmission of the optical signal to the second terminal if the switch mode is configured in a second mode; and one or more processors configured to toggle the optical switch mode between the first mode and the second mode to cause the optical switch to generate a pulse envelope signal.

Another implementation of a pulsed-wave LIDAR system may be achieved by detecting a relative phase difference between two optical signals. For example, the pulse-wave LIDAR system may include a laser source configured to provide an optical signal; a pulse envelope generator (e.g., Mach-Zehnder modulator) configured to generate a pulse envelope signal based on a relative phase difference between a first optical signal associated with the optical signal and a second optical signal associated with the optical signal; and an EDFA configured to amplify the pulse envelope signal and send the pulse envelope signal into free space via one or more optical elements.

Another implementation of a pulsed-wave LIDAR system may be achieved by modulating a light signal using an electrical field. For example, the pulse-wave LIDAR system may include a laser source configured to provide an optical signal; a pulse envelope generator (e.g., electro-absorption modulator (EAM)) configured to generate a pulse envelope signal by modulating the light signal using an electric field;

and an EDFA configured to amplify the pulse envelope signal and send the amplified pulse envelope signal into free space via one or more optical elements.

Another implementation of a pulsed-wave LIDAR system may be achieved by varying a gain configuration on a semiconductor optical amplifier (SOA) across a plurality of gain configurations of the SOA. For example, the pulse-wave LIDAR system may include a laser source configured to provide an optical signal; an SOA having a plurality of gain configurations, where the SOA is configured to receive the optical signal, and amplify the optical signal based on a gain configuration of the plurality of gain configurations; and one or more processors configured to adjust the gain configuration of the SOA across at least a subset of the plurality of gain configurations to cause the SOA to generate an amplified signal corresponding to a pulse envelope signal.

The pulsed-wave LIDAR systems in the aforementioned implementations are able to achieve object recognition at a wide range of distances (e.g., short and long) that are required for autonomous vehicle applications, and without having to produce more amplifier power than that capable by the amplifiers in the conventional LIDAR system. Furthermore, the pulsed-wave LIDAR system relaxes the speckle processing requirements.

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

1. System Environment for Autonomous Vehicles

FIG. 1A is a block diagram illustrating an example of a system environment for autonomous vehicles according to some implementations.

Referring to FIG. 1A, an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments, and it will be appreciated that the aforementioned components 102-116 can vary widely based upon the type of vehicle within which these components are utilized.

For simplicity, the implementations discussed hereinafter will focus on a wheeled land vehicle such as a car, van, truck, bus, etc. In such implementations, the prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 can include wheels and/or tires along with a transmission and/or any other mechanical drive components to convert the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

Various levels of autonomous control over the vehicle 100 can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, LIDAR (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100. Each sensor 130 can output sensor data at various data rates, which may be different than the data rates of other sensors 130.

The outputs of sensors 130 may be provided to a set of control subsystems 150, including, a localization subsystem 152, a planning subsystem 156, a perception subsystem 154, and a control subsystem 158. The localization subsystem 152 can perform functions such as precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 100. A machine learning model in accordance with some implementations can be utilized in tracking objects. The planning subsystem 156 can perform functions such as planning a trajectory for vehicle 100 over some timeframe given a desired destination as well as the static and moving objects within the environment. A machine learning model in accordance with some implementations can be utilized in planning a vehicle trajectory. The control subsystem 158 can perform functions such as generating suitable control signals for controlling the various controls in the vehicle control system 120 in order to implement the planned trajectory of the vehicle 100. A machine learning model can be utilized to generate one or more signals to control an autonomous vehicle to implement the planned trajectory.

It will be appreciated that the collection of components illustrated in FIG. 1A for the vehicle control system 120 is merely exemplary in nature. Individual sensors may be omitted in some implementations. Additionally or alternatively, in some implementations, multiple sensors of types illustrated in FIG. 1A may be used for redundancy and/or to cover different regions around a vehicle, and other types of sensors may be used. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1A. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1A, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. Data collected by the one or more sensors 130 can be uploaded to a computing system 172 via the network 170 for additional processing. In some implementations, a time stamp can be added to each instance of vehicle data prior to uploading.

Each processor illustrated in FIG. 1A, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The environment illustrated in FIG. 1A is not intended to limit implementations disclosed herein. Indeed, other alternative hardware and/or software environments may be used without departing from the scope of implementations disclosed herein.

2. FM LIDAR for Automotive Applications

Figure 3A:
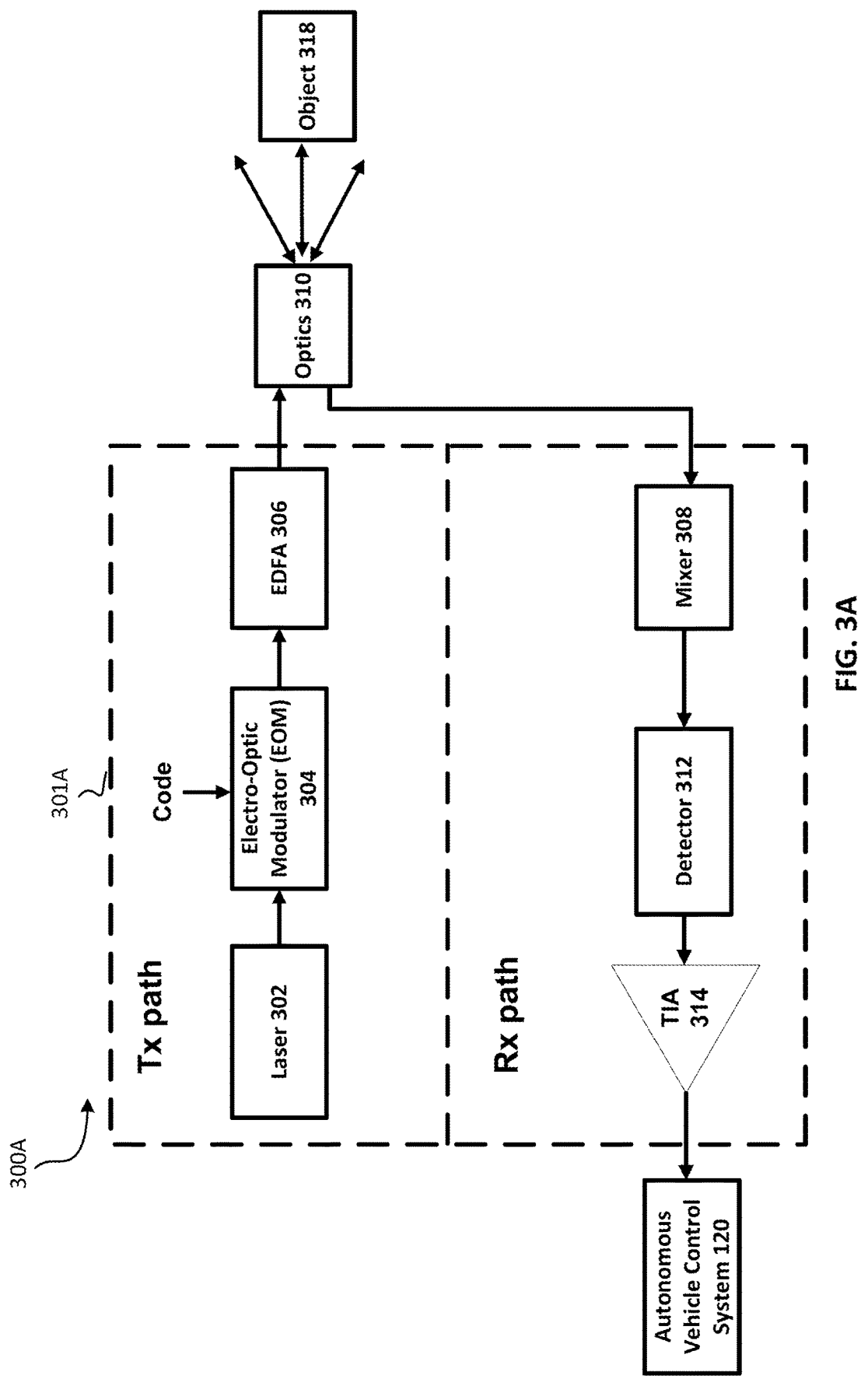
FIG. 3A is a block diagram illustrating an example environment of a LIDAR system in pulsed-wave operation using an EDFA for operating an autonomous vehicle, according to some implementations.
Figure 3B:
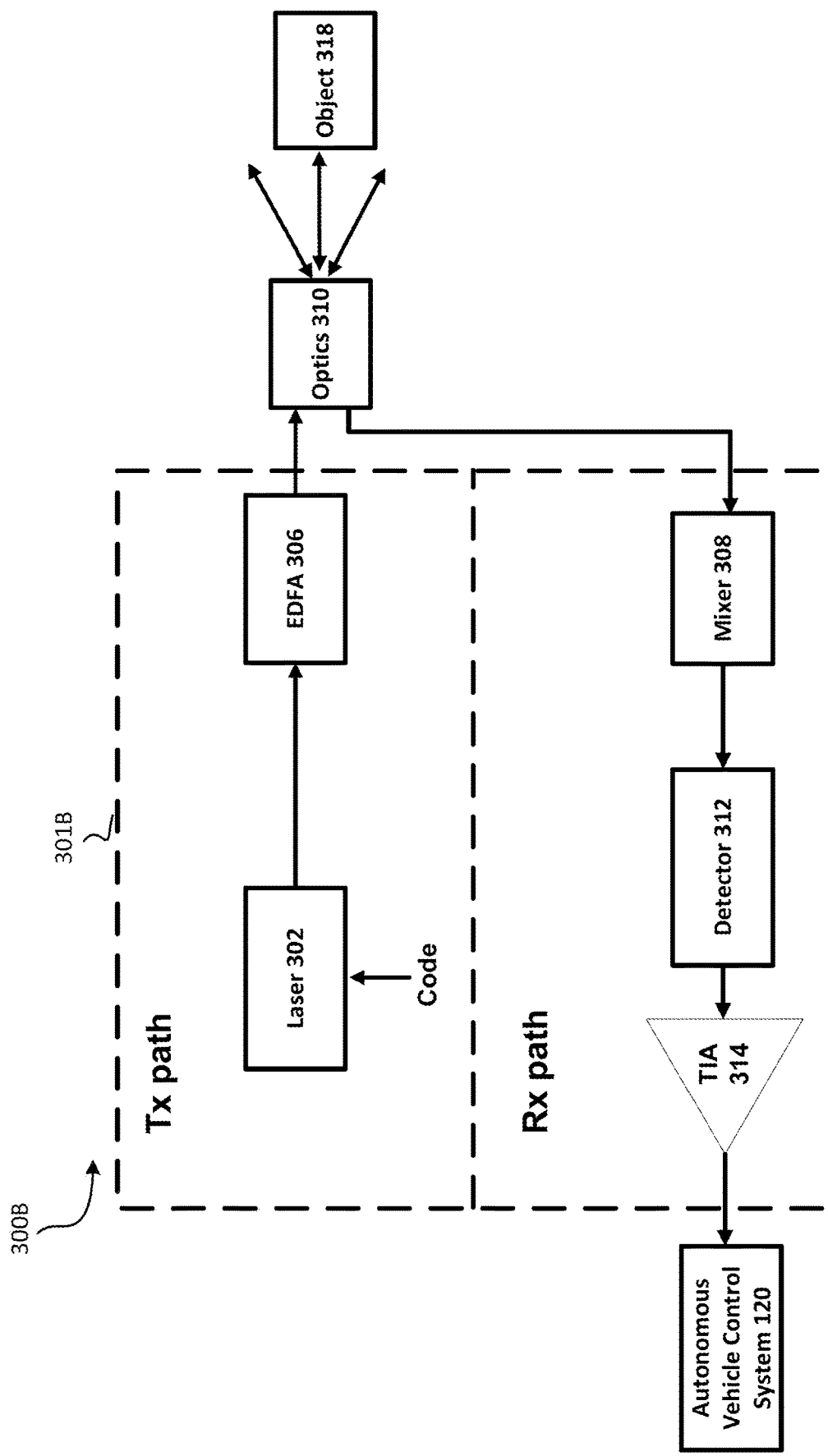
FIG. 3B is a block diagram illustrating an example environment of a LIDAR system in pulsed-wave operation using an EDFA and directly modulating a laser source for operating an autonomous vehicle, according to some implementations.
Figure 4B:
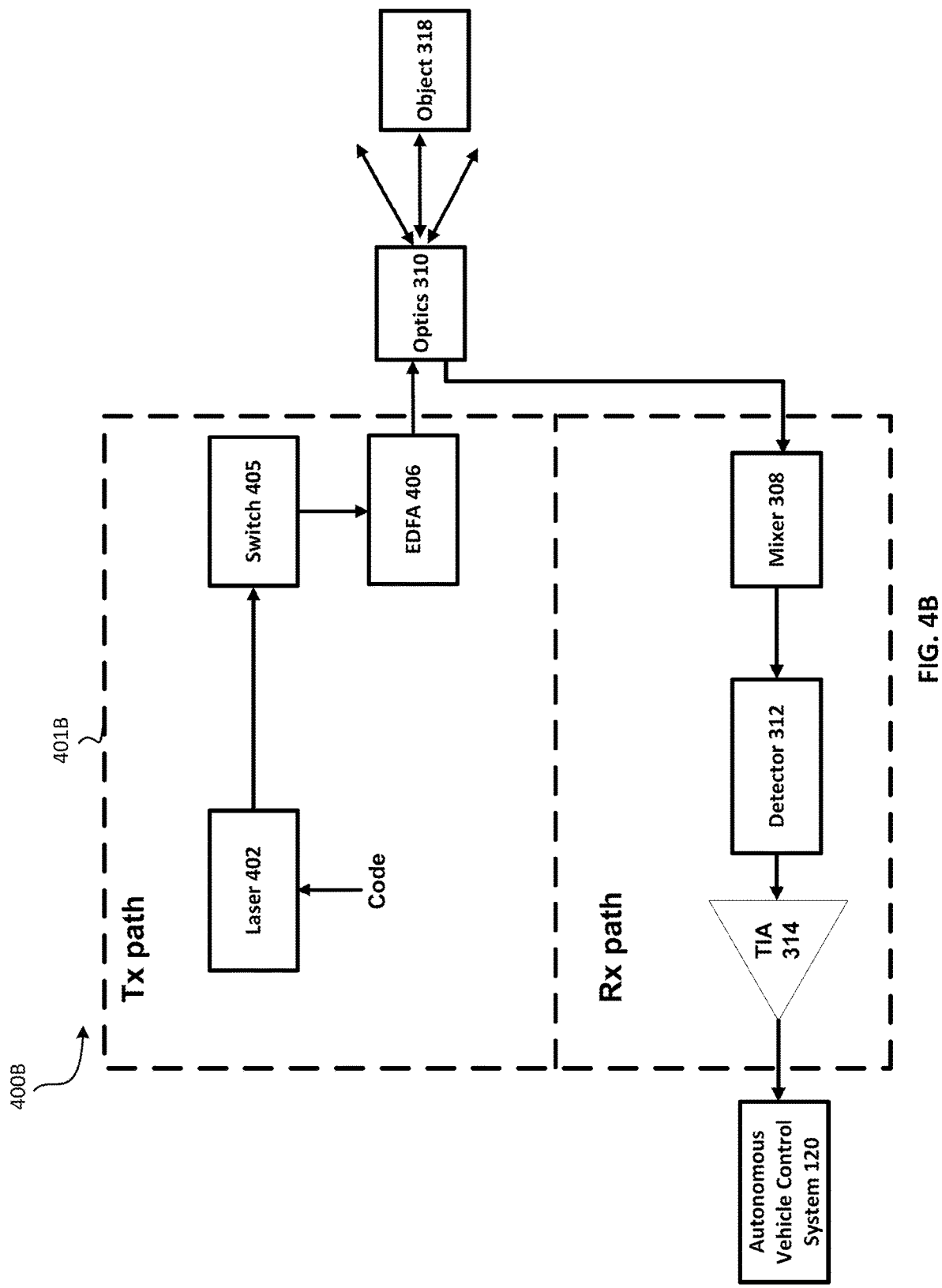
FIG. 4B is a block diagram illustrating an example environment of a LIDAR system in pulsed-wave operation using an optical switch for operating an autonomous vehicle, according to some implementations.
Figure 5:
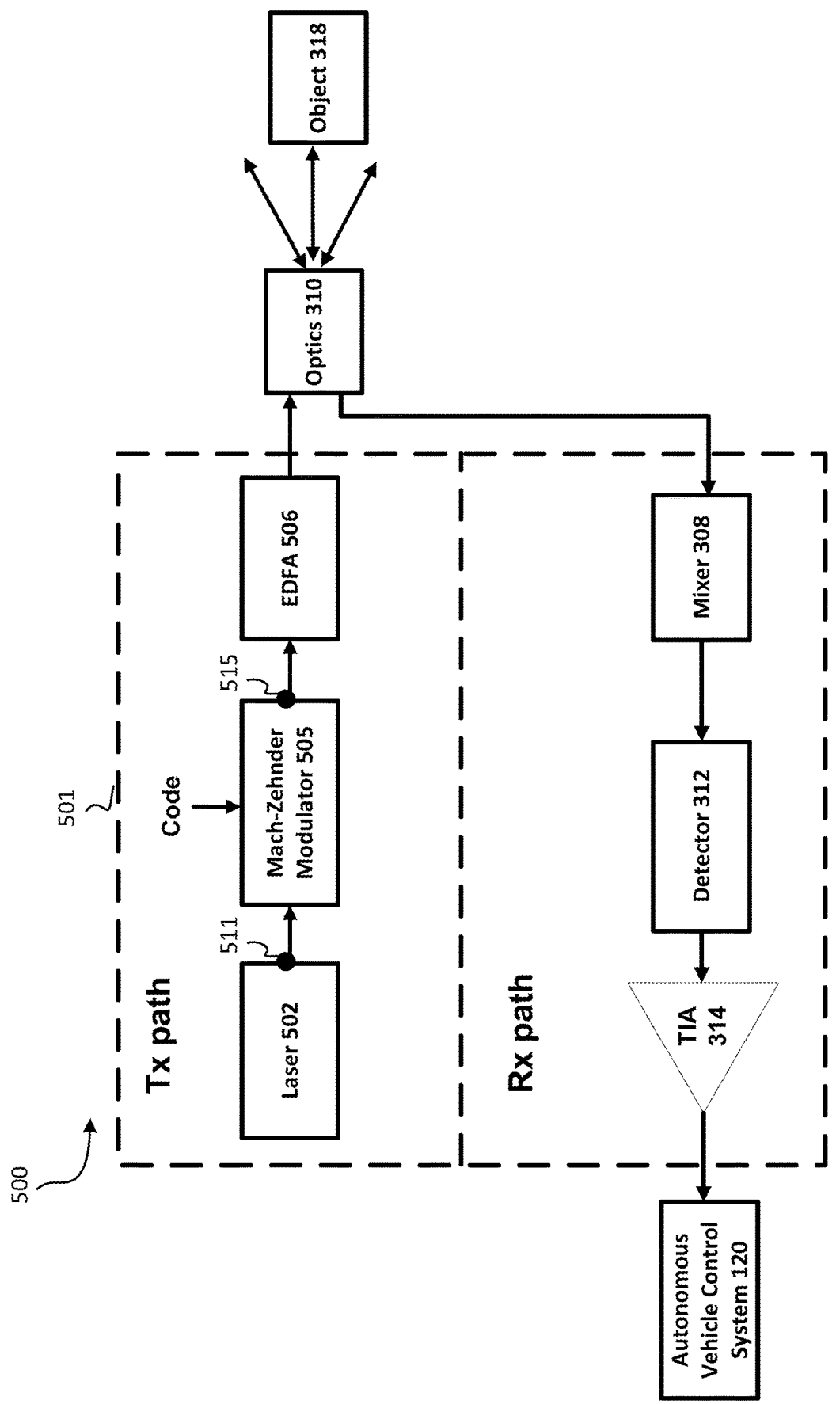
FIG. 5 is a block diagram illustrating an example environment of a LIDAR system in pulsed-wave operation using a Mach-Zehnder modulator for operating an autonomous vehicle, according to some implementations.
Figure 6:
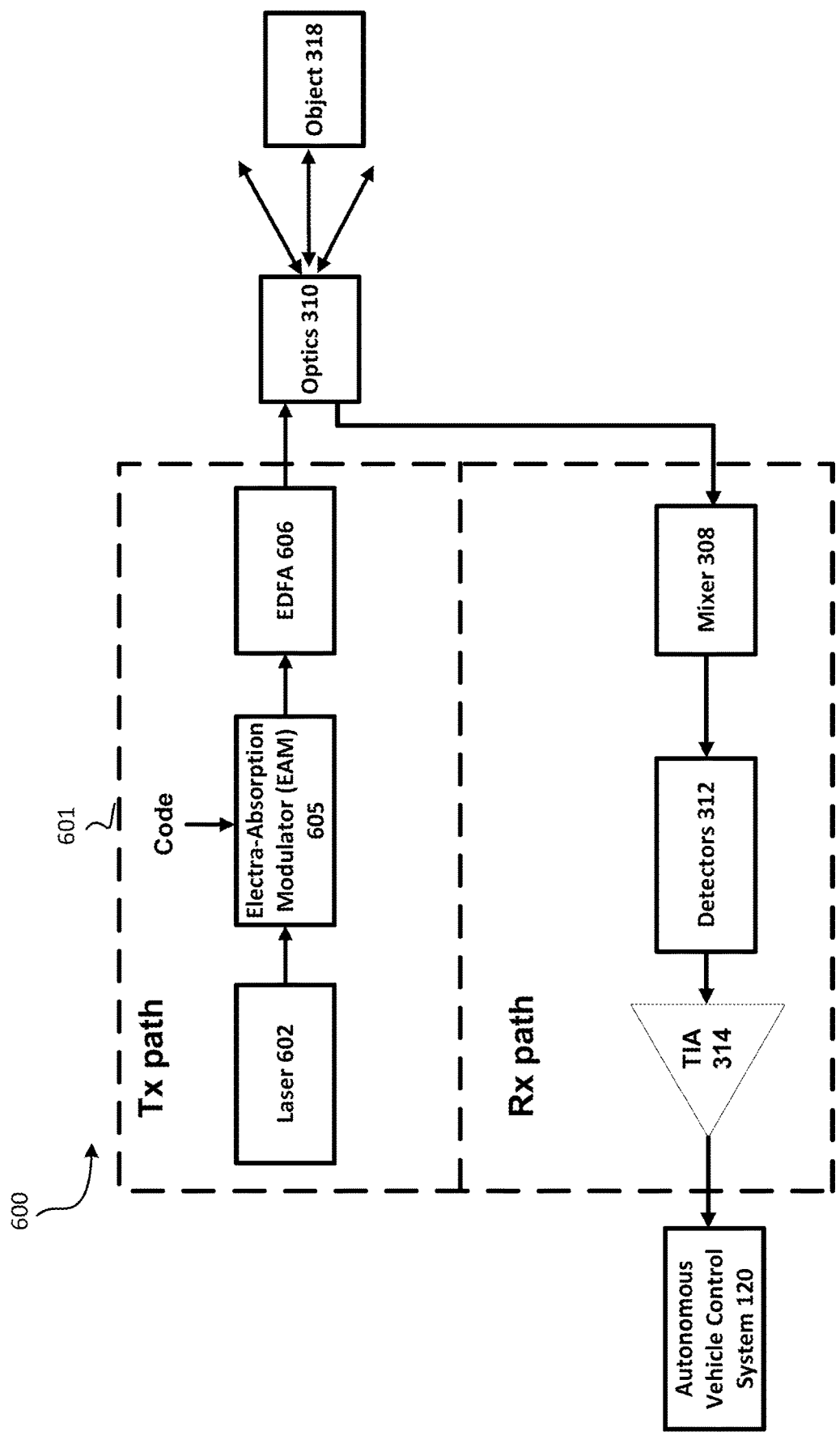
FIG. 6 is a block diagram illustrating an example environment of a LIDAR system in pulsed-wave operation using an electro-absorption modulator (EAM) for operating an autonomous vehicle, according to some implementations.
Figure 7:
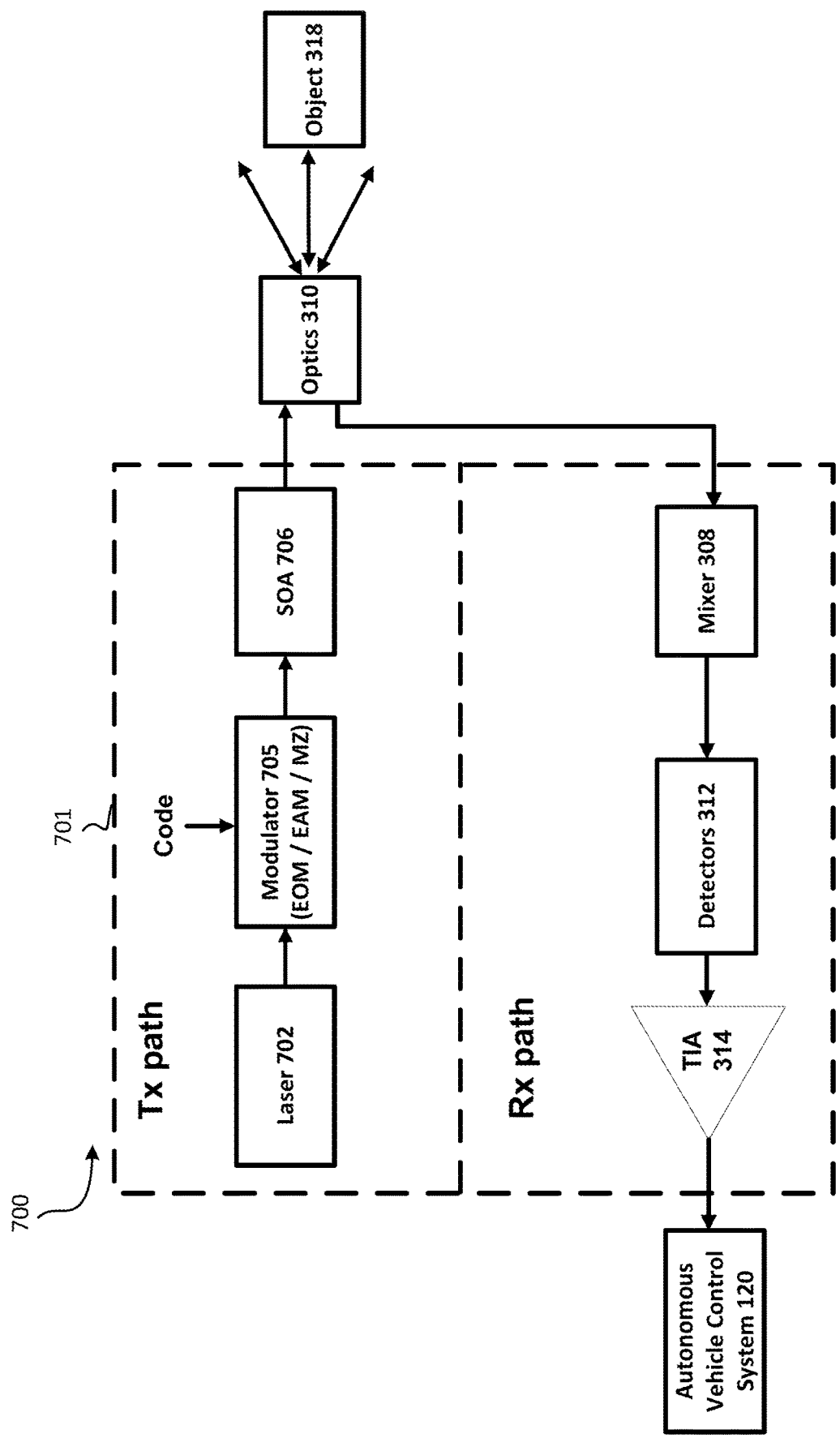
FIG. 7 is a block diagram illustrating an example environment of a LIDAR system in pulsed-wave operation using a semiconductor optical amplifier (SOA) for operating an autonomous vehicle, according to some implementations.
Figure 8:
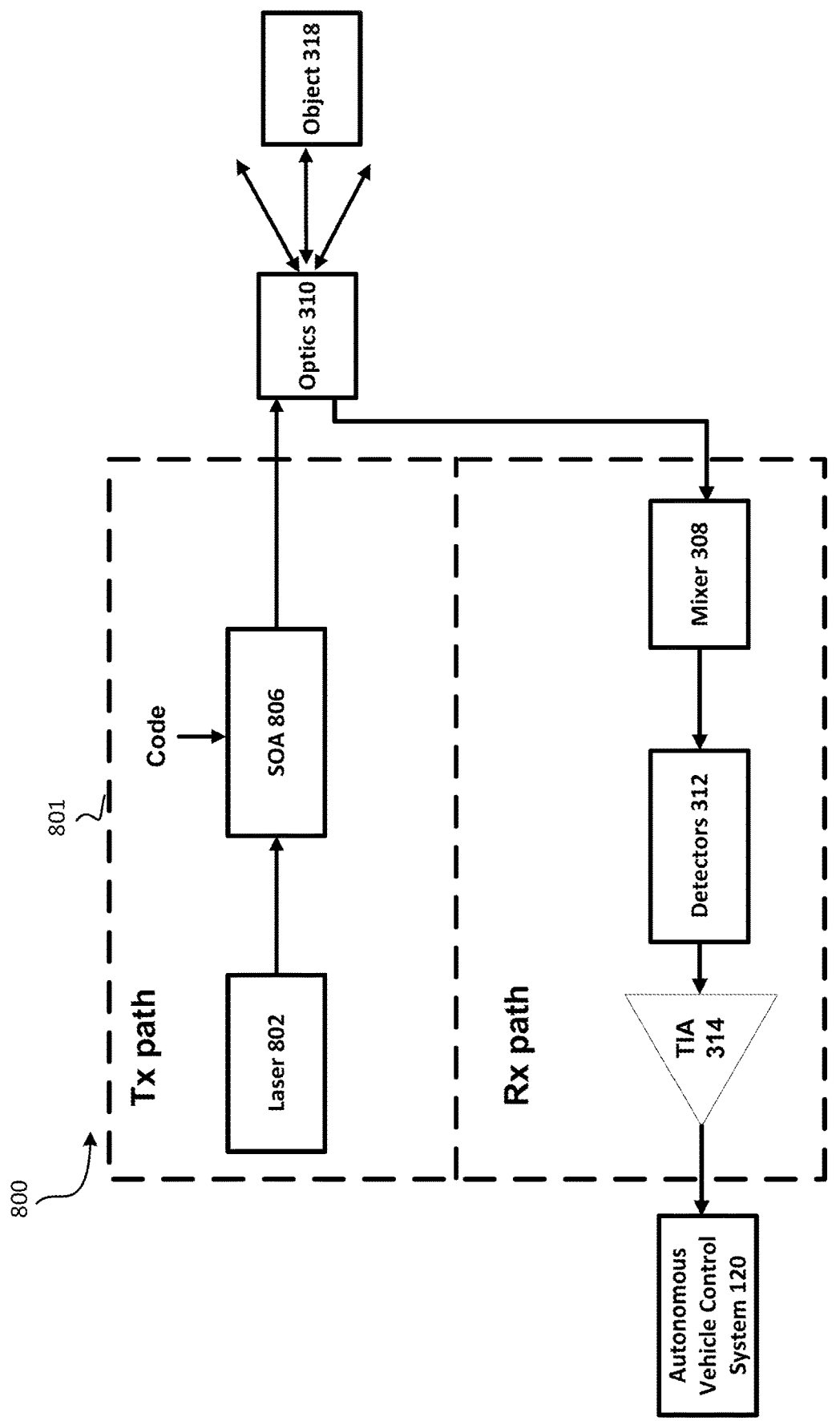
FIG. 8 is a block diagram illustrating an example environment of a LIDAR system in pulsed-wave operation using a semiconductor optical amplifier (SOA) and index modulation for operating an autonomous vehicle, according to some implementations.

A truck can include a LIDAR system (e.g., vehicle control system 120 in FIG. 1A, LIDAR system 301A in FIG. 3A, LIDAR system 301B in FIG. 3B, LIDAR system 401A in FIG. 4A, LIDAR system 401B in FIG. 4B, LIDAR system 501 in FIG. 5, LIDAR system 601 in FIG. 6, LIDAR system 701 in FIG. 7, LIDAR system 801 in FIG. 8, etc.). In some implementations, the LIDAR system can use frequency modulation to encode an optical signal and scatter the encoded optical signal into free-space using optics. By detecting the frequency differences between the encoded optical signal and a returned signal reflected back from an object, the frequency modulated (FM) LIDAR system can determine the location of the object and/or precisely measure the velocity of the object using the Doppler effect. In some implementations, an FM LIDAR system may use a continuous wave (referred to as, "FMCW LIDAR") or a quasi-continuous wave (referred to as, "FMQW LIDAR"). In some implementations, the LIDAR system can use phase modulation (PM) to encode an optical signal and scatters the encoded optical signal into free-space using optics.

An FM or phase-modulated (PM) LIDAR system may provide substantial advantages over conventional LIDAR systems with respect to automotive and/or commercial trucking applications. To begin, in some instances, an object (e.g., a pedestrian wearing dark clothing) may have a low reflectivity, in that it only reflects back to the sensors (e.g., sensors 130 in FIG. 1A) of the FM or PM LIDAR system a low amount (e.g., 10% or less) of the light that hit the object. In other instances, an object (e.g., a shiny road sign) may have a high reflectivity (e.g., above 10%), in that it reflects back to the sensors of the FM LIDAR system a high amount of the light that hit the object.

Regardless of the object's reflectivity, an FM LIDAR system may be able to detect (e.g., classify, recognize, discover, etc.) the object at greater distances (e.g., 2×) than a conventional LIDAR system. For example, an FM LIDAR system may detect a low reflectivity object beyond 300 meters, and a high reflectivity object beyond 400 meters.

To achieve such improvements in detection capability, the FM LIDAR system may use sensors (e.g., sensors 130 in FIG. 1A). In some implementations, these sensors can be single photon sensitive, meaning that they can detect the smallest amount of light possible. While an FM LIDAR system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM LIDAR system in infrared wavelengths, the FM or PM LIDAR system can broadcast stronger light pulses or light beams while meeting eye safety standards. Conventional LIDAR systems are often not single photon sensitive and/or only operate in near infrared wavelengths, requiring them to limit their light output (and distance detection capability) for eye safety reasons.

Thus, by detecting an object at greater distances, an FM LIDAR system may have more time to react to unexpected obstacles. Indeed, even a few milliseconds of extra time could improve safety and comfort, especially with heavy vehicles (e.g., commercial trucking vehicles) that are driving at highway speeds.

Another advantage of an FM LIDAR system is that it provides accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR system to determine distant or sparse data points as objects and/or track how those objects are moving over time. For example, an FM LIDAR sensor (e.g., sensors 130 in FIG. 1A) may only receive a few returns (e.g., hits) on an object that is 300 m away, but if those return give a velocity value of interest (e.g., moving towards the vehicle at >70 mph), then the FM LIDAR system and/or the autonomous vehicle control system may determine respective weights to probabilities associated with the objects.

Faster identification and/or tracking of the FM LIDAR system gives an autonomous vehicle control system more time to maneuver a vehicle. A better understanding of how fast objects are moving also allows the autonomous vehicle control system to plan a better reaction.

Another advantage of an FM LIDAR system is that it has less static compared to conventional LIDAR systems. That is, the conventional LIDAR systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR systems often need extra hardware, complex software, and/or more computational power to manage this "noise."

In contrast, FM LIDAR systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR systems produce (e.g., generates, derives, etc.) more accurate data with less hardware or software requirements, enabling safer and smoother driving.

Lastly, an FM LIDAR system is easier to scale than conventional LIDAR systems. As more self-driving vehicles (e.g., cars, commercial trucks, etc.) show up on the road, those powered by an FM LIDAR system likely will not have to contend with interference issues from sensor crosstalk. Furthermore, an FM LIDAR system uses less optical peak power than conventional LIDAR sensors. As such, some or all of the optical components for an FM LIDAR can be produced on a single chip, which produces its own benefits, as discussed herein.

2.1 Commercial Trucking

Figure 1B:
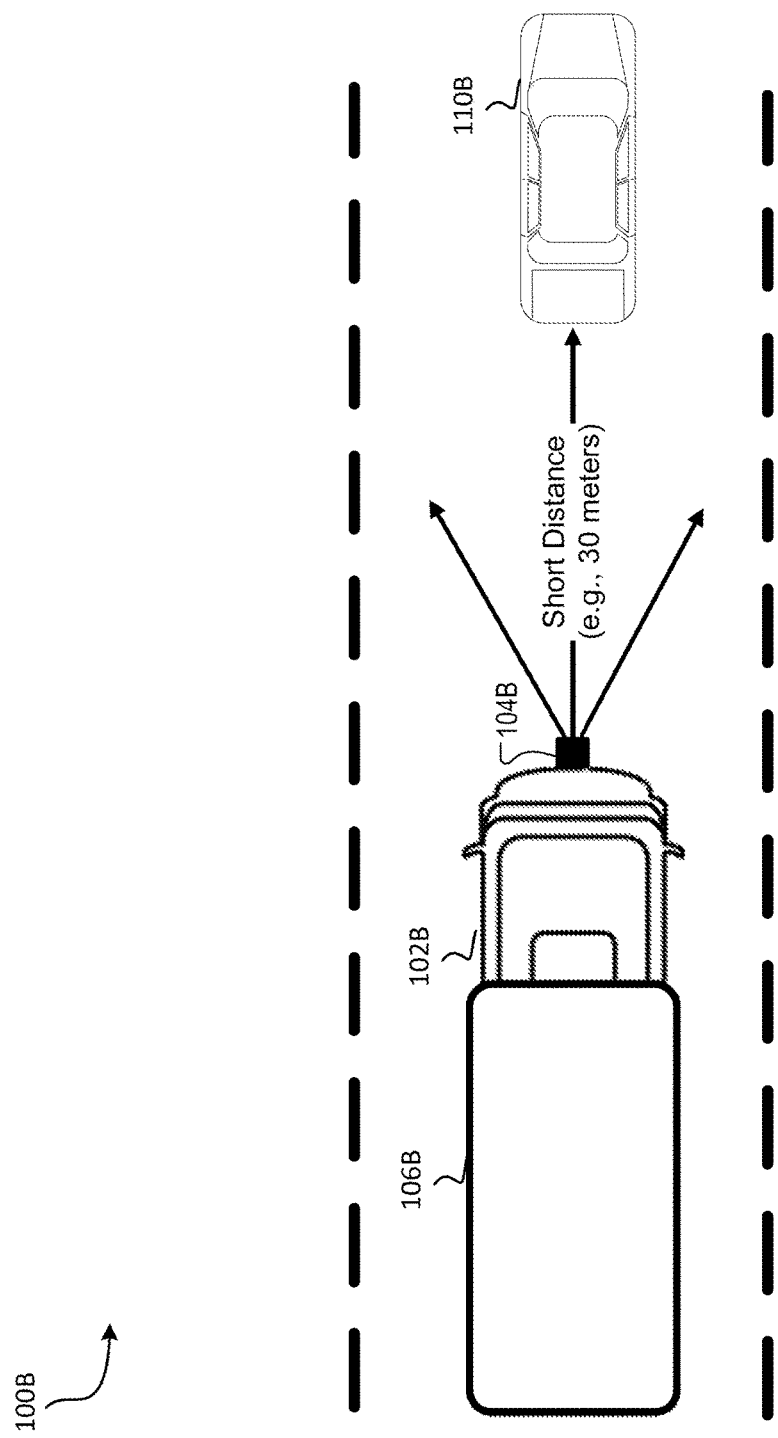
FIG. 1B is a block diagram illustrating an example of a system environment for autonomous commercial trucking vehicles, according to some implementations.

FIG. 1B is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. In some implementations, the commercial truck 102B may be a flatbed truck, a refrigerated truck (e.g., a reefer truck), a vented van (e.g., dry van), a moving truck, etc. In some implementations, the cargo 106B may be goods and/or produce. In some implementations, the commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 1B as another vehicle) that is within a distance range that is equal to or less than 30 meters from the truck.

The commercial truck 102B may include a LIDAR system 104B (e.g., an FM LIDAR system, vehicle control system 120 in FIG. 1A, LIDAR system 201 in FIG. 2, etc.) for determining a distance to the object 110B and/or measuring the velocity of the object 110B. Although FIG. 1B shows that one LIDAR system 104B is mounted on the front of the commercial truck 102B, the number of LIDAR system and the mounting area of the LIDAR system on the commercial truck are not limited to a particular number or a particular area. The commercial truck 102B may include any number of LIDAR systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the LIDAR system 104B in environment 100B may be configured to detect an object (e.g., another vehicle, a bicycle, a tree, street signs, potholes, etc.) at short distances (e.g., 30 meters or less) from the commercial truck 102B.

Figure 1C:
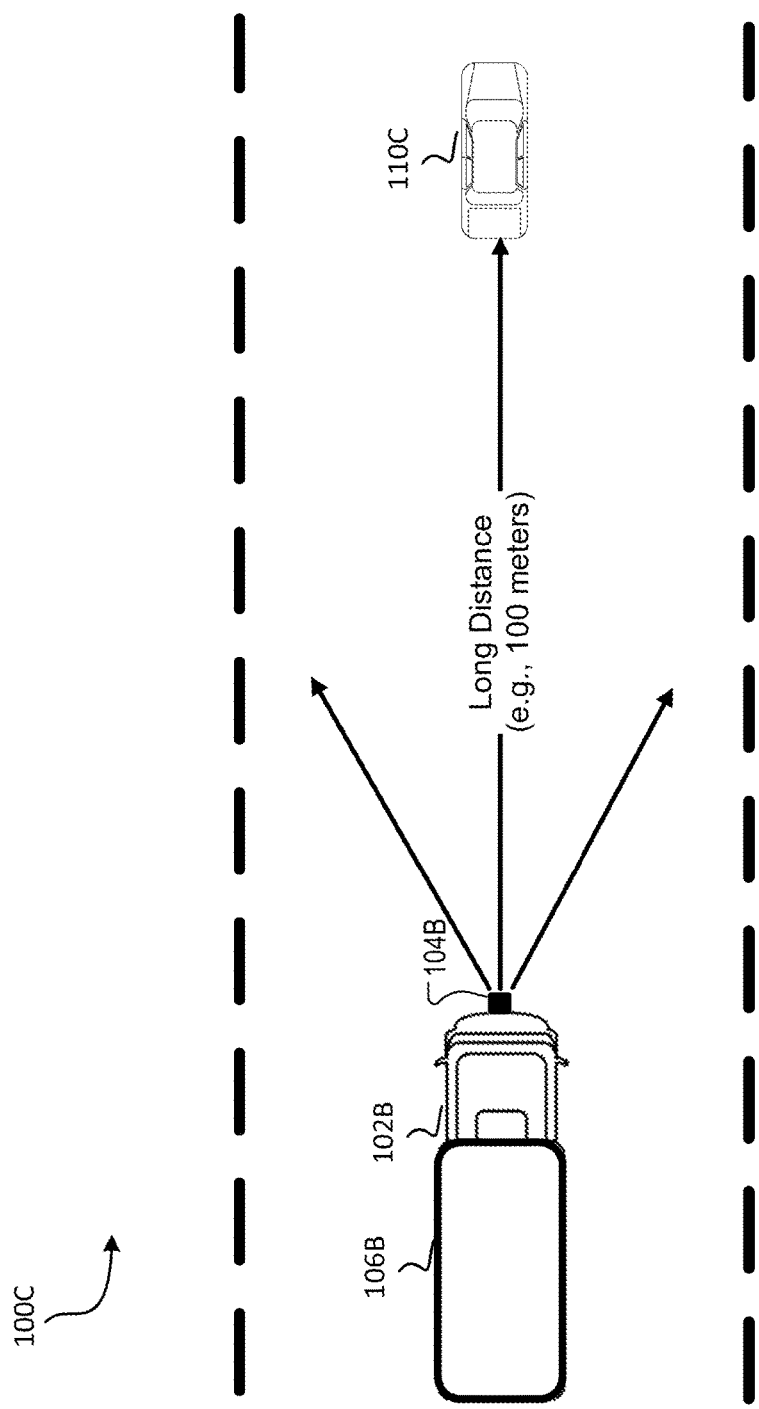
FIG. 1C is a block diagram illustrating an example of a system environment for autonomous commercial trucking vehicles, according to some implementations.

FIG. 1C is a block diagram illustrating an example of a system environment for autonomous commercial trucking vehicles, according to some implementations. The environment 100C includes the same components (e.g., commercial truck 102B, cargo 106B, LIDAR system 104B, etc.) that are included in environment 100B.

The environment 100C includes an object 110C (shown in FIG. 1C as another vehicle) that is within a distance range that is (i) more than 30 meters and (ii) equal to or less than 150 meters from the commercial truck 102B. As shown, the LIDAR system 104B in environment 100C may be configured to detect an object (e.g., another vehicle, a bicycle, a tree, street signs, potholes, etc.) at a distance (e.g., 100 meters) from the commercial truck 102B.

FIG. 1D is a block diagram illustrating an example of a system environment for autonomous commercial trucking vehicles, according to some implementations. The environment 100D includes the same components (e.g., commercial truck 102B, cargo 106B, LIDAR system 104B, etc.) that are included in environment 100B.

The environment 100D includes an object 110D (shown in FIG. 1D as another vehicle) that is within a distance range that is more than 150 meters from the commercial truck 102B. As shown, the LIDAR system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM LIDAR systems (e.g., FMCW and/or FMQW systems) or PM LIDAR systems are well-suited for commercial trucking applications due to the advantages described above. As a result, commercial trucks equipped with such systems may have an enhanced ability to safely move both people and goods across short or long distances, improving the safety of not only the commercial truck but of the surrounding vehicles as well. In various implementations, such FM or PM LIDAR systems can be used in semi-autonomous applications, in which the commercial truck has a driver and some functions of the commercial truck are autonomously operated using the FM or PM LIDAR system, or fully autonomous applications, in which the commercial truck is operated entirely by the FM or LIDAR system, alone or in combination with other vehicle systems.

3. CW Operation, Quasi-CW Operation, and Pulsed-Wave Operation

In a LIDAR system that uses CW modulation (sometimes referred to as, "CW operation"), the modulator modulates the laser light continuously. For example, if a modulation cycle is 10 microseconds, an input signal is modulated throughout the whole 10 microseconds.

In a LIDAR system that uses quasi-CW modulation (sometimes referred to as, "quasi-CW operation"), the modulator modulates the laser light to have both an active portion and an inactive portion. For example, for a 10 microsecond cycle, the modulator modulates the laser light only for 2 microseconds (sometimes referred to as, "the active portion"), but does not modulate the laser light for 8 microseconds (sometimes referred to as, "the inactive portion"). Since the light signal does not have to be in the on-state (e.g., enabled, powered, transmitting, etc.) all the time, the LIDAR system may be able to reduce power consumption for the portion of time (e.g., 8 microseconds) where the modulator does not have to provide a continuous signal. Furthermore, if the energy in the off-state (e.g., disabled, powered-down, etc.) can be expended during the actual measurement time, then there may be a boost to signal-to-noise ratio (SNR) and/or a reduction in signal processing requirements to coherently integrate all the energy in the longer time scale.

In a LIDAR system that uses pulsed-wave modulation (sometimes referred to as, "pulsed-wave operation"), the modulator modulates the laser light to have both an active portion and an inactive portion. One or more gates then seed the laser input to an optical amplifier via an optical switch, thereby taking advantage of the optical gain buildup that results in an instantaneous output power increase of 1/(optical duty cycle) and a reduction (e.g., by the duty cycle) in the processing requirements, all while maintaining a constant signal power.

Figure 2:
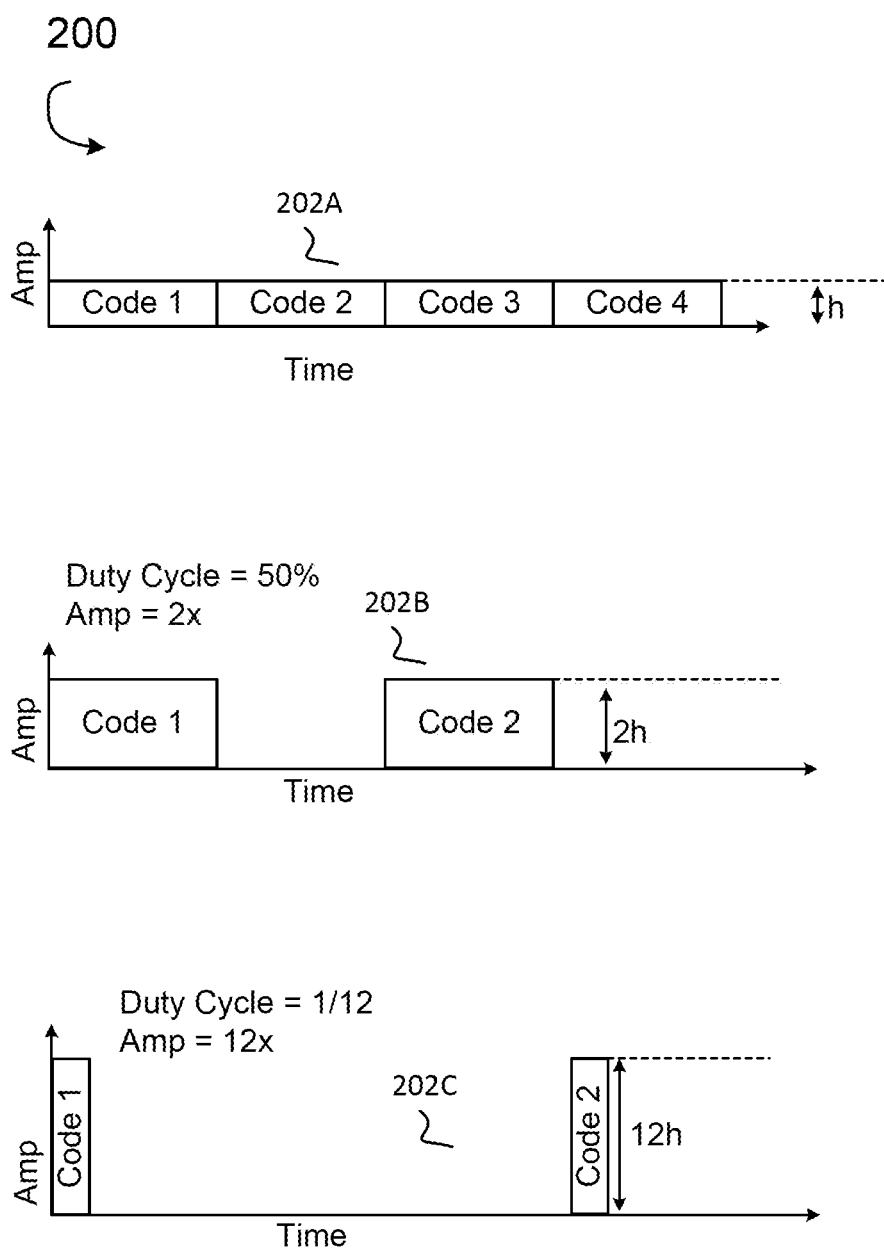
FIG. 2 is a time-based graph depicting the differences (e.g., differences in amplitude, period, average power, duty cycle, etc.) between the waveforms produced by one or more LIDAR systems that use CW operation, quasi-CW operation, and/or pulsed-wave operation.

FIG. 2 is a time-based graph depicting the differences (e.g., differences in amplitude, period, average power, duty cycle, etc.) between the waveforms produced by one or more LIDAR systems that use CW operation, quasi-CW operation, and/or pulsed-wave operation. The time-based graph 200 includes waveform 202a, waveform 202b, and waveform 202c. A LIDAR system (e.g., LIDAR 136 in FIG. 1A) that uses CW operation may construct a waveform 202a (e.g., a continuous wave) having an amplitude of 'h' based on a plurality of Codes (e.g., Code 1, Code 2, Code 3, and Code 4). A LIDAR system (e.g., LIDAR 136 in FIG. 1A) that uses quasi-CW operation may construct a waveform 202b (e.g., a quasi-CW) having a duty cycle equal (or substantially equal) to 50% and an amplitude that this equal to (or substantially equal to) twice (e.g., 2h) the amplitude of waveform 202a based on a plurality of Codes (e.g., Code 1 and Code 2). A LIDAR system (e.g., LIDAR 136 in FIG. 1A) that uses pulsed-wave operation may construct a waveform 202c (e.g., a pulsed-wave) having a duty cycle that is equal (or substantially equal) to $1/12$ the duty cycle of waveform 202a and an amplitude that this equal (or substantially equal) to 12× (e.g., 12h) the amplitude of waveform 202a based on a plurality of Codes (e.g., Code 1 and Code 2).

4. Pulsed-Wave Operation Using an EDFA

FIG. 3A is a block diagram illustrating an example environment of a LIDAR system in pulsed-wave operation using an EDFA for operating an autonomous vehicle, according to some implementations. The environment 300A includes a LIDAR system 301A that includes a transmit (Tx) path and a receive (Rx) path. The Tx path may include one or more Tx input/output ports (not shown in FIG. 3A) and the Rx path may include one or more Rx input/output ports (not shown in FIG. 3A).

The environment 300A includes one or more optics 310 (e.g., an oscillatory scanner, a unidirectional scanner, a Risley prism, a circulator optic, and/or a beam collimator, etc.) that are coupled to the LIDAR system 301A. In some implementations, the one or more optics 210 may be coupled to the Tx path via the one or more Tx input/output ports. In some implementations, the one or more optics 310 may be coupled to the Rx path via the one or more Rx input/output ports.

The environment 300A includes a vehicle control system 120 (e.g., vehicle control system 120 in FIG. 1) that is coupled to the LIDAR system 301. In some implementations, the vehicle control system 120 may be coupled to the Rx path via the one or more Rx input/output ports.

The Tx path includes a laser source 302, an electro-optic modulator (EOM) 304A, and an erbium doped fiber amplifier (EDFA) 306. The Rx path includes a mixer 308, a detector 312, and a transimpedance (TIA) 212. Although FIG. 3A shows only a select number of components and only one input/output channel; the environment 300A may include any number of components and/or input/output channels (in any combination) that are interconnected in any arrangement to facilitate combining multiple functions of a LIDAR system, to support the operation of a vehicle.

The laser source 302 is configured to generate a light signal that is derived from (or associated with) a local oscillator (LO) signal. In some implementations, the light signal may have an operating wavelength that is equal to or substantially equal to 1550 nanometers. In some implementations, the light signal may have an operating wavelength that is between 1400 nanometers and 1600 nanometers.

The laser source 302 is configured to provide the light signal to the EOM 304A, which is configured to modulate a phase and/or a frequency of the light signal based on a code signal (e.g., "00011010") to generate a modulated light signal. The EOM 304A is configured to send the modulated light signal to the EDFA 306. The EDFA 306 is associated with a plurality of gain configurations, each that determine the level at which the EDFA 306 should amplify (e.g., boost) an input signal. In some implementations, the EDFA 306 may be configured in a constant current mode.

One or more processors (e.g., autonomous vehicle control system 120, computing system 172, etc.) are configured to vary (e.g., change, adjust, modify, etc.) a gain configuration of the EDFA 306 to cause the EDFA 306 to generate a pulsed envelope signal by amplifying the modulated light signal. The one or more processors, in some implementations, may vary the gain configuration of the EDFA 306 across one or more gain configurations (e.g., a subset, all) of the plurality of gain configurations in a random, periodic (e.g., at any point between 0.1 milliseconds to 5 milliseconds, etc.), or continuous manner. The EDFA 306 is configured to send the pulsed envelope signal to the optics 310.

The optics 310 are configured to steer the amplified light signal that it receives from the Tx path into free space within a given field of view toward an object 318, receive a returned signal reflected back from the object 318 via a receiver (not shown in FIG. 3A), and provide the returned signal to the mixer 308 of the Rx path.

The laser source 302, in some implementations, may be configured to provide an unmodulated LO signal (not shown in FIG. 3A) to the mixer 308 of the Rx path. The EOM 304, in some implementations, may be configured to provide a modulated LO signal (not shown in FIG. 3A) to the mixer 308 of the Rx path.

The mixer 308 is configured to mix (e.g., combine, multiply, etc.) the LO signal (modulated or unmodulated) with the returned signal to generate a down-converted signal and send the down-converted signal to the detector 312. In some arrangements, the mixer 308 is configured to send the LO signal (modulated or unmodulated) to the detector 312.

The detector 312 is configured to generate an electrical signal based on the down-converted signal and send the electrical signal to the TIA 314. In some arrangements, the detector 312 is configured to generate an electrical signal based on the down-converted signal and the modulated light signal.

The TIA 314 is configured to amplify the electrical signal and send the amplified electrical signal to the vehicle control system 120.

The vehicle control system 120 is configured to determine a distance to the object 318 and/or measures the velocity of the object 318 based on the one or more electrical signals that it receives from the TIA.

FIG. 3B is a block diagram illustrating an example environment of a LIDAR system in pulsed-wave operation using an EDFA and directly modulating a laser source for operating an autonomous vehicle, according to some implementations. Other than the removal of the electro-optic modulator (EOM) 304A, the environment 300B in FIG. 3B includes the same components (and at least their same functionality) as the environment 300A in FIG. 3A.

The laser source 302 is configured to generate a light signal that is derived from (or associated with) an LO signal. The laser source 302 is also configured to modulate a phase and/or a frequency of the light signal based on a code signal (e.g., "00011010") to generate a modulated light signal. The laser source 302 is configured to send the modulated light signal to the EDFA 306. The laser source 302, in some implementations, may be configured to provide an unmodulated or modulated LO signal (not shown in FIG. 3B) to the mixer 308 of the Rx path.

One or more processors (e.g., autonomous vehicle control system 120, computing system 172, etc.) are configured to vary (e.g., change, adjust, modify, etc.) a gain configuration of the EDFA 306 to cause the EDFA 306 to generate a pulsed envelope signal by amplifying the modulated light signal. The one or more processors, in some implementations, may vary the gain configuration of the EDFA 306 across one or more gain configurations (e.g., a subset, all) of the plurality of gain configurations in a random, periodic (e.g., at any point between 0.1 milliseconds to 5 milliseconds, etc.), or continuous manner. The EDFA 306 is configured to send the pulsed envelope signal to the optics 310

As discussed herein with respect to FIG. 3A, the optics 310 are configured to steer the light signal that it receives from the Tx path into free space within a given field of view toward an object 318, receive a returned signal reflected back from the object 318 via a receiver, and provide the returned signal to the Rx path. The Rx path generates one or more electrical signals from the returned signal and delivers the one or more electrical signals to the vehicle control system 120, which is configured to determine a distance to the object 318 and/or measures the velocity of the object 318 based on the one or more electrical signals that it receives from the Rx path.

An EDFA (e.g., EDFA 306 in FIG. 3A and/or FIG. 3B), in some implementations, may have a constant pumping rate of the gain, which in the absence of light on the input may cause the gain to increase over time, building up potential energy for optical energy release when an optical pulse is input to the EDFA. This energy storage mechanism of the EDFA makes it simple to concentrate the output optical energy into a pulse and achieve relatively similar average power (e.g., averaged over many pulse cycles) to if the input and output of the EDFA were continuous or quasi-continuous.

Figure 3C:
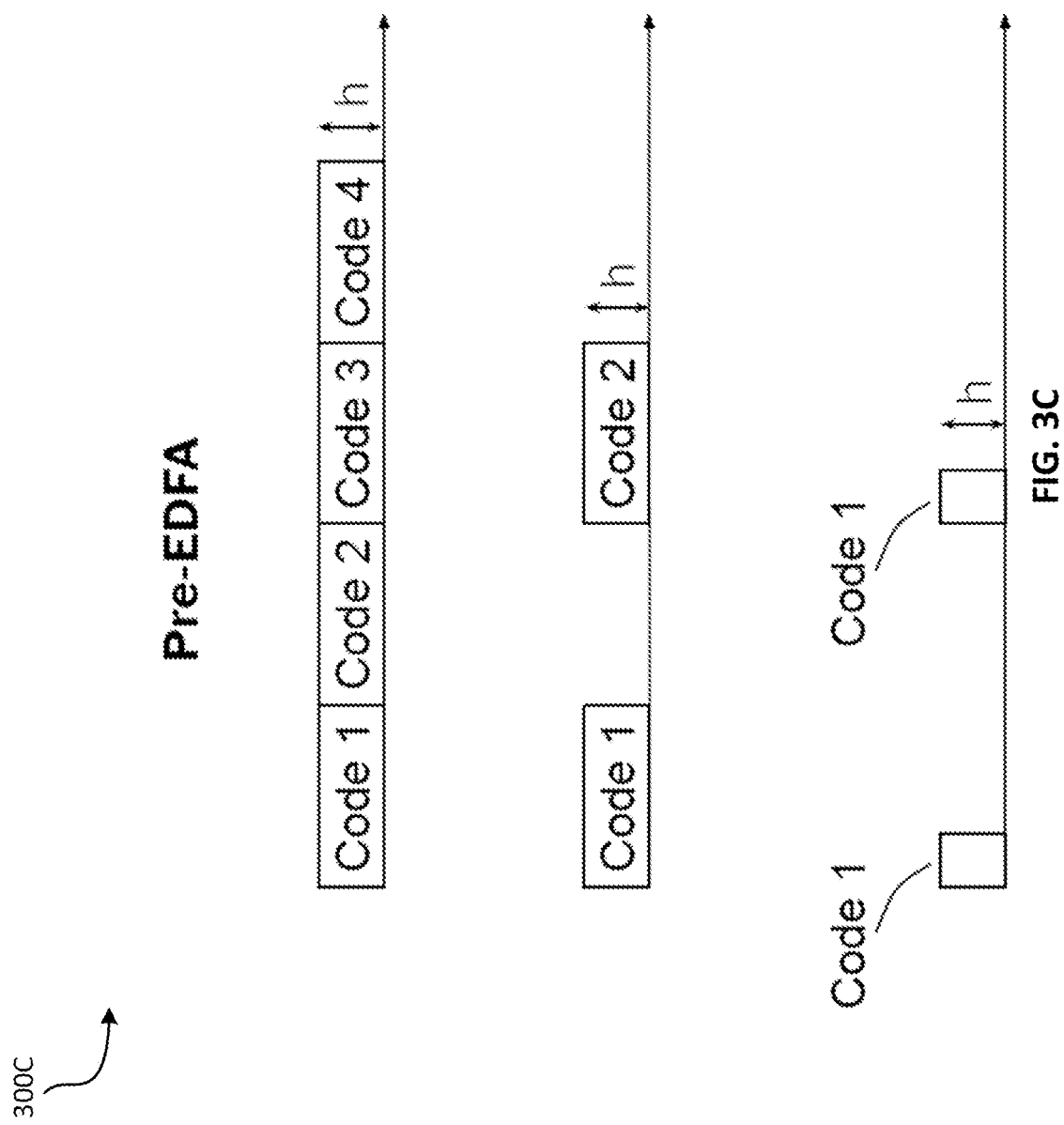
FIG. 3C illustrates an example waveform of the optical intensity before an EDFA, where the EDFA has a constant pumping rate of gain, according to some implementations.
Figure 3D:
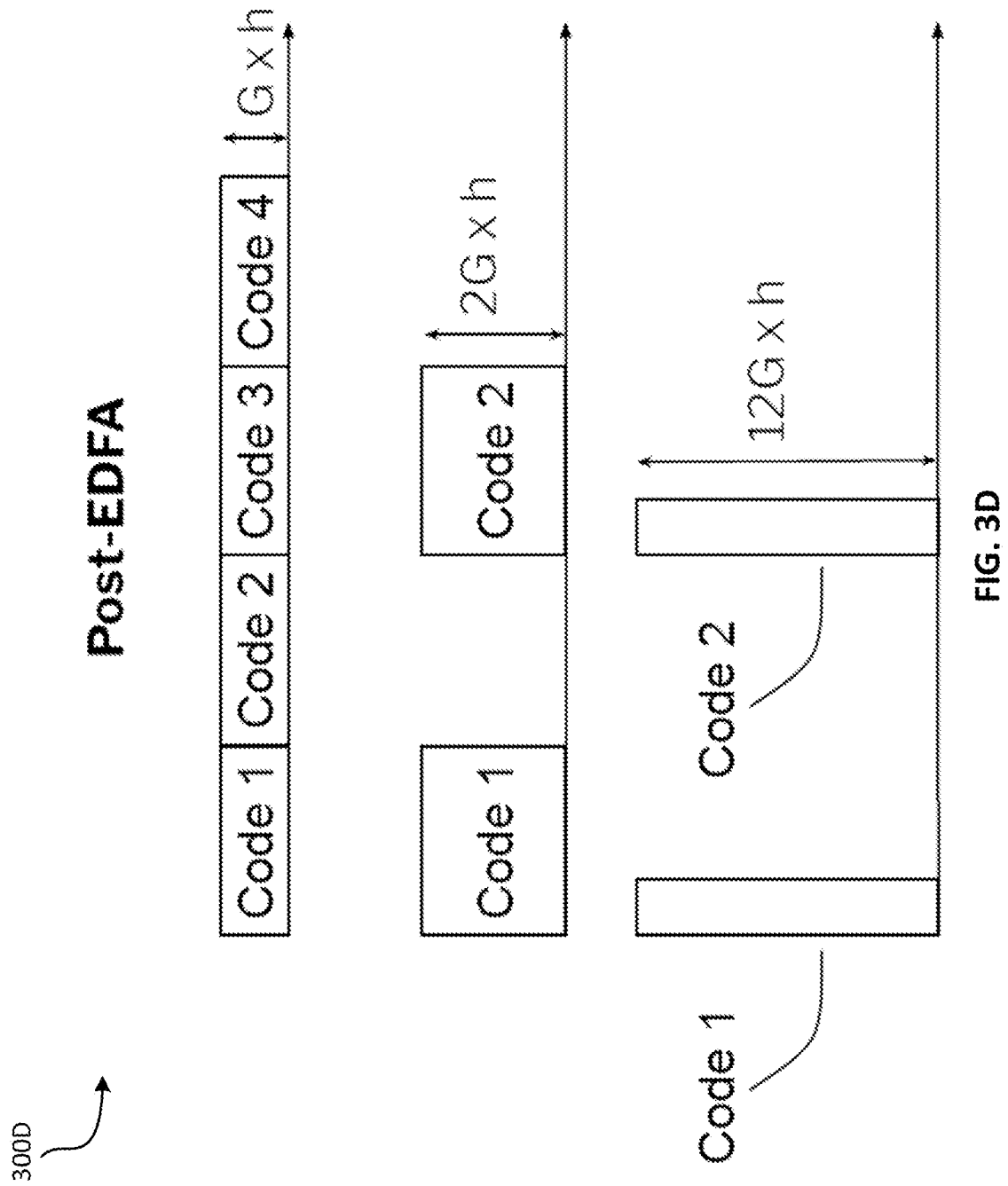
FIG. 3D illustrates an example waveform of the optical intensity after an EDFA, where the EDFA has a constant pumping rate of gain, according to some implementations.

FIG. 3C illustrates an example waveform of the optical intensity before an EDFA, where the EDFA has a constant pumping rate of gain, according to some implementations. FIG. 3D illustrates an example waveform of the optical intensity after an EDFA, where the EDFA has a constant pumping rate of gain, according to some implementations. However, in some implementations, the power in the pulse in both instances (e.g., before and after) would be increased by the inverse of the duty cycle.

5. Pulsed-Wave Operation Using an Optical Switch

FIG. 4A is a block diagram illustrating an example environment of a LIDAR system in pulsed-wave operation using an optical switch for operating an autonomous vehicle, according to some implementations. The environment 400A includes a LIDAR system 401A that includes a transmit (Tx) path and a receive (Rx) path. The Tx path may include one or more Tx input/output ports (not shown in FIG. 4A) and the Rx path may include one or more Rx input/output ports (not shown in FIG. 4A).

The environment 400A includes one or more optics 310 that are coupled to the LIDAR system 401A. In some implementations, the one or more optics 310 may be coupled to the Tx path via the one or more Tx input/output ports. In some implementations, the one or more optics 310 may be coupled to the Rx path via the one or more Rx input/output ports.

The environment 400A includes a vehicle control system 120 (e.g., vehicle control system 120 in FIG. 1) that is coupled to the LIDAR system 401. In some implementations, the vehicle control system 120 may be coupled to the Rx path via the one or more Rx input/output ports.

The Tx path includes a laser source 402, an electro-optic modulator (EOM) 404A, an optical switch 405, and an erbium doped fiber amplifier (EDFA) 406. The Rx path includes a mixer 308, a detector 312, and a transimpedance (TIA) 312. Although FIG. 4A shows only a select number of components and only one input/output channel; the environment 400A may include any number of components and/or input/output channels (in any combination) that are interconnected in any arrangement to facilitate combining multiple functions of a LIDAR system, to support the operation of a vehicle.

The laser source 402 is configured to generate a light signal that is derived from (or associated with) an LO signal. The laser source 402 is configured to provide the light signal to the EOM 404A. The laser source 402, in some implementations, may be configured to provide an unmodulated LO signal (not shown in FIG. 3A) to the mixer 308 of the Rx path.

The EOM 404A is configured to modulate a phase and/or a frequency of the light signal based on a code signal (e.g., "00011010") to generate a modulated light signal. The EOM 404A is configured to send the modulated light signal to the optical switch 405. The EOM 404A, in some implementations, may be configured to modulate an LO signal (not shown in FIG. 4A) and provide the modulated LO signal to the mixer 308 of the Rx path.

One or more processors (e.g., autonomous vehicle control system 120, computing system 172, etc.) are configured to toggle (e.g., activate, deactivate, enable, disable, move, flip, adjust, configure, etc.) the optical switch 405 between an enabled state (e.g., allowing a light signal to pass between an input and an output of the switch) and disabled state (e.g., preventing a light signal from passing between an input and an output of the switch) to cause the optical switch 405 to generate a pulsed envelope signal based on the modulated light signal. The one or more processors, in some implementations, may toggle the optical switch 405 in a random, periodic (e.g., at any point between 0.1 microseconds to 10 microseconds, etc.) or continuous manner. The optical switch 405 is configured to send the pulsed envelope signal to the EDFA 406.

The EDFA 406 is configured to generate an amplified pulsed envelope signal by amplifying the pulsed envelope signal and send the amplified pulsed envelope signal to the optics 310.

As discussed herein with respect to FIG. 3A, the optics 310 are configured to steer the light signal that it receives from the Tx path into free space within a given field of view toward an object 318, receive a returned signal reflected back from the object 318 via a receiver, and provide the returned signal to the Rx path. The Rx path generates one or more electrical signals from the returned signal and delivers the one or more electrical signals to the vehicle control system 120, which is configured to determine a distance to the object 318 and/or measures the velocity of the object 318 based on the one or more electrical signals that it receives from the Rx path.

The waveform at node 411 (i.e., output of laser 402) that corresponds to the optical signal may be represented by the following equation:

$$E_{411} = E_0 * e^{i(wt)} \quad (1)$$

The waveform at node 413 (i.e., output of EOM 404) that corresponds to the modulated optical signal may be represented by the following equation:

$$E_{413} = E_0 * e^{i(wt+\theta)} \quad (2)$$

where $\theta(t) = \pi(\text{code})$.

The waveform at node 415 (i.e., output of switch 405) that corresponds to the pulse envelope signal may be represented by the following equation:

$$E_{415} = E_{413} * \psi(t) \quad (3)$$

where $\psi = \{1, t=0:T \; 0, t=T: \text{PRP}\}$

FIG. 4B is a block diagram illustrating an example environment of a LIDAR system in pulsed-wave operation using an optical switch for operating an autonomous vehicle, according to some implementations. Other than the removal of the electro-optic modulator (EOM) 404A, the environment 400B in FIG. 4B includes the same components (and at least their same functionality) as the environment 400A in FIG. 4A.

The laser source 402 is configured to generate a light signal that is derived from (or associated with) an LO signal. The laser source 402 is also configured to modulate a phase and/or a frequency of the light signal based on a code signal (e.g., "00011010") to generate a modulated light signal. The laser source 402 is configured to send the modulated light signal to the optical switch 405. The laser source 402, in some implementations, may be configured to provide an unmodulated or modulated LO signal (not shown in FIG. 4B) to the mixer 308 of the Rx path.

One or more processors (e.g., autonomous vehicle control system 120, computing system 172, etc.) are configured to toggle (e.g., activate, deactivate, enable, disable, move, flip, adjust, configure, etc.) the optical switch 405 between an enabled state (e.g., allowing a light signal to pass between an input and an output of the switch) and disabled state (e.g., preventing a light signal from passing between an input and an output of the switch) to cause the optical switch 405 to generate a pulsed envelope signal based on the modulated light signal. The one or more processors, in some implementations, may toggle the optical switch 405 in a random, periodic (e.g., at any point between 0.1 microseconds to 10 microseconds, etc.) or continuous manner. The optical switch 405 is configured to send the pulsed envelope signal to the EDFA 406.

The EDFA 406 is configured to generate an amplified pulsed envelope signal by amplifying the pulsed envelope signal and send the amplified pulsed envelope signal to the optics 310.

As discussed herein with respect to FIG. 3A, the optics 310 are configured to steer the light signal that it receives from the Tx path into free space within a given field of view toward an object 318, receive a returned signal reflected back from the object 318 via a receiver, and provide the returned signal to the Rx path. The Rx path generates one or more electrical signals from the returned signal and delivers the one or more electrical signals to the vehicle control system 120, which is configured to determine a distance to the object 318 and/or measures the velocity of the object 318 based on the one or more electrical signals that it receives from the Rx path.

Figure 4C:
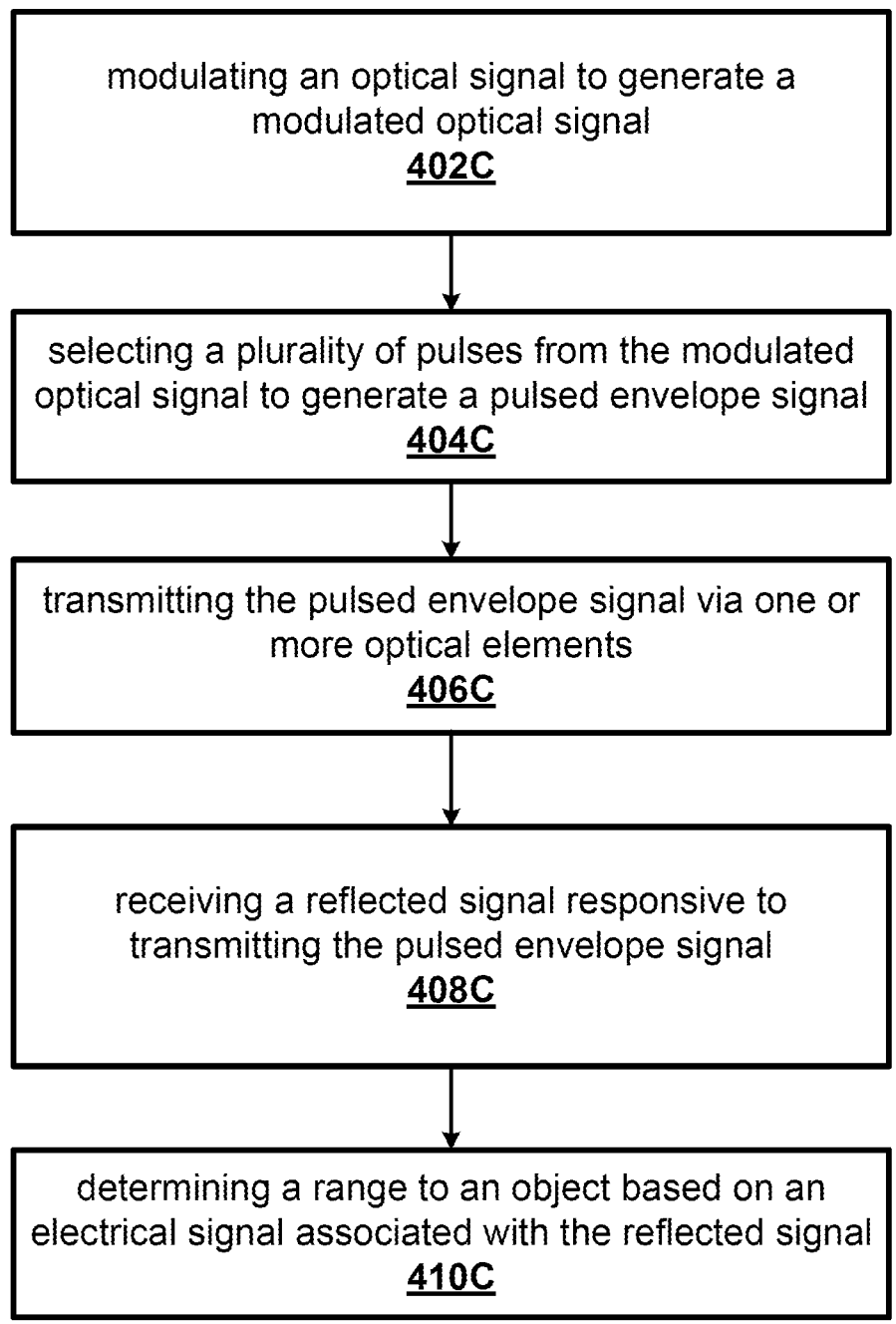
FIG. 4C is a flow chart that illustrates an example method for pulsed-wave LIDAR to support the operation of a vehicle, according to an implementation.

FIG. 4C is a flow chart that illustrates an example method for pulsed-wave LIDAR to support the operation of a vehicle, according to an implementation. Although steps are depicted in FIG. 4C as integral steps in a particular order for purposes of illustration, in other implementations, one or more steps, or portions thereof, are performed in a different order, or overlapping in time, in series or in parallel, or are omitted, or one or more additional steps are added, or the method is changed in some combination of ways. In some implementations, some or all operations of method 400C may be performed by one or more of the components (e.g., LIDAR system 401, optics 310, autonomous vehicle control system 120) depicted in environment 400A in FIG. 4A. In some implementations, some or all operations of method 400C may be performed by one or more of the components (e.g., LIDAR system 401, optics 310, autonomous vehicle control system 120) depicted in environment 400B in FIG. 4B.

The method 400C includes the operation 402C of modulating an optical signal to generate a modulated optical signal. In some implementations, the method 400C includes the operation 404C of selecting a plurality of pulses from the modulated optical signal to generate a pulsed envelope signal. In some implementations, the method 400C includes the operation 406C of transmitting the pulsed envelope signal via one or more optical elements. In some implementations, the method 400C includes the operation 408C of receiving a reflected signal responsive to transmitting the pulsed envelope signal. In some implementations, the method 400C includes the operation 410C of determining a range to an object based on an electrical signal associated with the reflected signal.

6. Pulsed-Wave Operation Using a Mach-Zehnder Modulator

FIG. 5 is a block diagram illustrating an example environment of a LIDAR system in pulsed-wave operation using a Mach-Zehnder modulator for operating an autonomous vehicle, according to some implementations. The environment 500A includes a LIDAR system 501 that includes a transmit (Tx) path and a receive (Rx) path. The Tx path may include one or more Tx input/output ports (not shown in FIG. 5) and the Rx path may include one or more Rx input/output ports (not shown in FIG. 5).

The environment 500A includes one or more optics 310 that are coupled to the LIDAR system 501. In some implementations, the one or more optics 310 may be coupled to the Tx path via the one or more Tx input/output ports. In some implementations, the one or more optics 310 may be coupled to the Rx path via the one or more Rx input/output ports.

The environment 500A includes a vehicle control system 120 (e.g., vehicle control system 120 in FIG. 1) that is coupled to the LIDAR system 501. In some implementations, the vehicle control system 120 may be coupled to the Rx path via the one or more Rx input/output ports.

The Tx path includes a laser source 502, a Mach-Zehnder modulator 505, and an erbium doped fiber amplifier (EDFA) 506. The Rx path includes a mixer 308, a detector 312, and a transimpedance (TIA) 312. Although FIG. 5 shows only a select number of components and only one input/output channel, the environment 500A may include any number of components and/or input/output channels (in any combination) that are interconnected in any arrangement to facilitate combining multiple functions of a LIDAR system, to support the operation of a vehicle.

The laser source 502 is configured to generate a light signal that is derived from (or associated with) an LO signal. The laser source 502 is configured to provide the light signal to the Mach-Zehnder modulator 505. The laser source 502, in some implementations, may be configured to provide an LO signal (not shown in FIG. 5) to the mixer 308 of the Rx path.

The Mach-Zehnder modulator 505 is configured to convert the relative phase shift variations between two paths derived by splitting the light signal from the laser source 502 and modulating the two paths with electro-optic modulation. The Mach-Zehnder modulator 505 is configured to generate a pulse envelope signal based on the relative phase variations. In some implementations, the Mach-Zehnder modulator 505 modulates a phase and/or a frequency of the pulse envelope signal based on a code signal (e.g., "00011010") to generate a modulated pulse envelope signal. The Mach-Zehnder modulator 505 is configured to send the pulse envelope signal (unmodulated or modulated) to the EDFA 506. The Mach-Zehnder modulator 505 may, in some implementations, modulate an LO signal and provide the modulated LO signal to the mixer 308 of the Rx path. The Mach-Zehnder modulator 505 may, in some implementations, be used with pulse shaping to correct for output amplitude decay on a signal.

The EDFA 506 is configured to generate an amplified pulsed envelope signal by amplifying the pulsed envelope signal and send the amplified pulsed envelope signal to the optics 310.

As discussed herein with respect to FIG. 3A, the optics 310 are configured to steer the light signal that it receives from the Tx path into free space within a given field of view toward an object 318, receive a returned signal reflected back from the object 318 via a receiver, and provide the returned signal to the Rx path. The Rx path generates one or more electrical signals from the returned signal and delivers the one or more electrical signals to the vehicle control system 120, which is configured to determine a distance to the object 318 and/or measures the velocity of the object 318 based on the one or more electrical signals that it receives from the Rx path.

Referring back to FIG. 5, one or more processors (e.g., autonomous vehicle control system 120, computing system 172, etc.) are configured to toggle (e.g., activate, deactivate, enable, disable, move, flip, adjust, configure, etc.) the output of the MZ modulator 505 between an enabled state (e.g., allowing a light signal to pass between an input and an output) and disabled state (e.g., preventing a light signal from passing between an input and an output) such that the MZ modulator 505 can generate a pulsed envelope signal in addition to the modulated light signal. The one or more processors, in some implementations, may toggle the output of the MZ modulator 505 in a random, periodic (e.g., at any point between 0.1 microseconds to 10 microseconds, etc.), or continuous manner. The the MZ modulator 505 is configured to send the modulated pulsed envelope signal to the EDFA 506.

In some implementations, the waveform at node 511 (i.e., output of laser 502) that corresponds to the optical signal may be represented by the following equation:

$$E_{511}=E_0 * e^{i(wt)}. \quad (4)$$

In some implementations, the waveform at node 515 (i.e., output of MZ modulator 505) that corresponds to the modulated and pulsed optical signal may be represented by the following equation:

$$E_{515}=E_0 * e^{i(wt)} * Code * \psi(t). \quad (5)$$

where $\psi=\{1, t=0:T\ 0, t=T:PRP\}$.

7. Pulsed-Wave Operation Using an EAM

FIG. 6 is a block diagram illustrating an example environment of a LIDAR system in pulsed-wave operation using an electro-absorption modulator (EAM) for operating an autonomous vehicle, according to some implementations. The environment 600 includes a LIDAR system 601 that includes a transmit (Tx) path and a receive (Rx) path. The Tx path may include one or more Tx input/output ports (not shown in FIG. 6) and the Rx path may include one or more Rx input/output ports (not shown in FIG. 6).

The environment 600 includes one or more optics 310 that are coupled to the LIDAR system 601. In some implementations, the one or more optics 310 may be coupled to the Tx path via the one or more Tx input/output ports. In some implementations, the one or more optics 310 may be coupled to the Rx path via the one or more Rx input/output ports.

The environment 600 includes a vehicle control system 120 (e.g., vehicle control system 120 in FIG. 1) that is coupled to the LIDAR system 601. In some implementations, the vehicle control system 120 may be coupled to the Rx path via the one or more Rx input/output ports.

The Tx path includes a laser source 602, an EAM 605, and an erbium doped fiber amplifier (EDFA) 606. The Rx path includes a mixer 308, a detector 312, and a transimpedance (TIA) 312. Although FIG. 6 shows only a select number of components and only one input/output channel; the environment 600 may include any number of components and/or input/output channels (in any combination) that are interconnected in any arrangement to facilitate combining multiple functions of a LIDAR system, to support the operation of a vehicle.

The laser source 602 is configured to generate a light signal that is derived from (or associated with) an LO signal. The laser source 602 is configured to provide the light signal to the EAM 605. The laser source 602, in some implementations, may be configured to provide an LO signal (not shown in FIG. 6) to the mixer 308 of the Rx path.

The EAM 605 is configured to modulate the amplitude (e.g., intensity) of the light signal via an electric voltage according to a code signal (e.g., "00011010"). That is, the EAM 605 is constructed from a semiconductor material that has an absorption coefficient. When one or more processors (e.g., autonomous vehicle control system 120, computing system 172, etc.) apply an external electric field to the EAM 605, the absorption coefficient changes resulting in a change in the bandgap energy, which in turn, causes the EAM 605 to modulate the amplitude of the incoming light signal. By modulating the amplitude of the light signal, the EAM 605 is able to generate a pulse envelope signal. The EAM 605 is configured to send the pulse envelope signal to the EDFA 606. The EAM 605 may, in some implementations, modulate an LO signal and provide the modulated LO signal to the mixer 308 of the Rx path.

The EDFA 606 amplifies the pulse envelope signal to generate an amplified pulse envelope signal and sends the amplified pulsed envelope signal to the optics 310.

As discussed herein with respect to FIG. 3A, the optics 310 are configured to steer the light signal that it receives from the Tx path into free space within a given field of view toward an object 318, receive a returned signal reflected back from the object 318 via a receiver, and provide the returned signal to the Rx path. The Rx path generates one or more electrical signals from the returned signal and delivers the one or more electrical signals to the vehicle control system 120, which is configured to determine a distance to the object 318 and/or measures the velocity of the object 318 based on the one or more electrical signals that it receives from the Rx path.

8. Pulsed-Wave Operation Using an SOA

FIG. 7 is a block diagram illustrating an example environment of a LIDAR system in pulsed-wave operation using a semiconductor optical amplifier (SOA) for operating an autonomous vehicle, according to some implementations. The environment 700 includes a LIDAR system 701 that includes a transmit (Tx) path and a receive (Rx) path. The Tx path may include one or more Tx input/output ports (not shown in FIG. 7) and the Rx path may include one or more Rx input/output ports (not shown in FIG. 7).

The environment 700 includes one or more optics 310 that are coupled to the LIDAR system 701. In some implementations, the one or more optics 310 may be coupled to the Tx path via the one or more Tx input/output ports. In some implementations, the one or more optics 310 may be coupled to the Rx path via the one or more Rx input/output ports.

The environment 700 includes a vehicle control system 120 (e.g., vehicle control system 120 in FIG. 1) that is coupled to the LIDAR system 701. In some implementations, the vehicle control system 120 may be coupled to the Rx path via the one or more Rx input/output ports.

The Tx path includes a laser source 702, a modulator 705, a semiconductor optical amplifier (SOA) 706. The Rx path includes a mixer 308, a detector 312, and a transimpedance (TIA) 312. Although FIG. 7 shows only a select number of components and only one input/output channel; the environment 700 may include any number of components and/or input/output channels (in any combination) that are interconnected in any arrangement to facilitate combining multiple functions of a LIDAR system, to support the operation of a vehicle.

The laser source 702 is configured to generate a light signal that is derived from (or associated with) an LO signal. The laser source 702 is configured to provide the light signal to the modulator 705. The laser source 702, in some implementations, may be configured to provide an LO signal (not shown in FIG. 7) to the mixer 308 of the Rx path.

The modulator is configured to modulate a phase and/or a frequency and/or intensity of the light signal based on a code signal (e.g., "00011010") to generate a modulated light signal. The modulator 705, in some implementations, may be an EOM (e.g., EOM 404 in FIG. 4A), an EAM (e.g., EAM 605 in FIG. 6), or a Mach-Zehnder modulator (e.g., Mach-Zehnder modulator 505 in FIG. 5). The modulator 705 is configured to send the modulated light signal to the SOA 706. The modulator 705 may, in some implementations, modulate an LO signal and provide the modulated LO signal to the mixer 308 of the Rx path.

The SOA 706 may be associated with a plurality of gain configurations, each that determine the level at which the SOA 706 should amplify (e.g., boost) an input signal.

One or more processors (e.g., autonomous vehicle control system 120, computing system 172, etc.) are configured to vary (e.g., change, adjust, modify, etc.) a gain configuration of the SOA 706 to cause the SOA 706 to generate a pulsed envelope signal by amplifying the modulated light signal. The one or more processors, in some implementations, may vary the gain configuration of the SOA 706 across one or more gain configurations (e.g., a subset, all) of the plurality of gain configurations in a random, periodic (e.g., at any point between 0.1 microseconds to 10 microseconds, etc.), or continuous manner. The SOA 706 is configured to send the pulsed envelope signal to the optics 310.

As discussed herein with respect to FIG. 3A, the optics 310 are configured to steer the light signal that it receives from the Tx path into free space within a given field of view toward an object 318, receive a returned signal reflected back from the object 318 via a receiver, and provide the returned signal to the Rx path. The Rx path generates one or more electrical signals from the returned signal and delivers the one or more electrical signals to the vehicle control system 120, which is configured to determine a distance to the object 318 and/or measures the velocity of the object 318 based on the one or more electrical signals that it receives from the Rx path.

FIG. 8 is a block diagram illustrating an example environment of a LIDAR system in pulsed-wave operation using a semiconductor optical amplifier (SOA) and index modulation for operating an autonomous vehicle, according to some implementations. Other than the removal of the modulator 705, the environment 800B in FIG. 8 includes the same components (and at least their same functionality) as the environment 700 in FIG. 7.

The laser source 802 is configured to generate a light signal that is derived from (or associated with) an LO signal. The laser source 802 is configured to send the modulated light signal to the SOA 806. The laser source 802, in some implementations, may be configured to provide an LO signal (not shown in FIG. 8) to the mixer 308 of the Rx path.

The SOA 806 is associated with a plurality of gain configurations, each that determine the level at which the SOA 806 should amplify (e.g., boost) an input signal.

One or more processors (e.g., autonomous vehicle control system 120, computing system 172, etc.) are configured to vary (e.g., change, adjust, modify, etc.) a gain configuration of the SOA 806 to cause the SOA 806 to generate a pulsed envelope signal by amplifying the modulated light signal. The one or more processors, in some implementations, may vary the gain configuration of the SOA 806 across one or more gain configurations (e.g., a subset, all) of the plurality of gain configurations in a random, periodic (e.g., at any point between 0.1 microseconds to 10 microseconds, etc.), or continuous manner.

The SOA 806 is configured to modulate the light signal and/or the pulse envelope signal using index modulation and based on a code signal (e.g., "00011010"). The SOA 806 is configured to send the pulsed envelope signal to the optics 310. The SOA 806 may, in some implementations, modulate an LO signal and provide the modulated LO signal to the mixer 308 of the Rx path.

As discussed herein with respect to FIG. 3A, the optics 310 are configured to steer the light signal that it receives from the Tx path into free space within a given field of view toward an object 318, receive a returned signal reflected back from the object 318 via a receiver, and provide the returned signal to the Rx path. The Rx path generates one or more electrical signals from the returned signal and delivers the one or more electrical signals to the vehicle control system 120, which is configured to determine a distance to the object 318 and/or measures the velocity of the object 318 based on the one or more electrical signals that it receives from the Rx path.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated by one of skill in the art the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10 (e.g., 1 to 4).

Some implementations of the present disclosure are described below in the context of one or more hi-res Doppler LIDAR systems that are mounted onto an area (e.g., front, back, side, top, and/or bottom) of a personal automobile; but, implementations are not limited to this context. In other implementations, one or multiple systems of the same type or other high resolution LIDAR, with or without Doppler components, with overlapping or non-overlapping fields of view or one or more such systems mounted on smaller or larger land, sea or air vehicles, piloted or autonomous, are employed. In other implementations, the scanning hi-res LIDAR is mounted at temporary or permanent fixed positions on land or sea.

What is claimed:

1. A light detection and ranging (LIDAR) system for a vehicle, the LIDAR system comprising:
   a laser source configured to provide an optical signal at a first signal power;
   a modulator configured to modulate the optical signal from the laser source to generate a modulated optical signal;
   an amplifier having a plurality of gain levels, at which the amplifier is configured to amplify the modulated optical signal; and
   one or more processors configured to:
      based on the first signal power and a duty cycle of the optical signal, vary a gain level of the amplifier from the plurality of gain levels to generate an amplified pulse signal,
      transmit the amplified pulse signal from the amplifier to an environment,
      receive a reflected signal that is reflected from an object, responsive to transmitting the amplified pulse signal,
      determine a range to the object based on an electrical signal associated with the reflected signal; and
   an optical switch coupled between the modulator and the amplifier,
      wherein the one or more processors are configured to control the optical switch between an enabled state and a disabled state to cause the optical switch to generate a pulse signal based on the modulated optical signal.

2. The LIDAR system of claim 1, wherein
   the one or more processors are configured to determine a second signal power based on the first signal power and the duty cycle of the optical signal, and
   the amplifier is configured to generate the amplified pulse signal at the second signal power.

3. The LIDAR system of claim 2, wherein the second signal power is different from the first signal power.

4. The LIDAR system of claim 1, wherein the amplifier transmits the amplified pulse signal via one or more optical elements.

5. The LIDAR system of claim 1, wherein the one or more processors are configured to vary the gain level of the amplifier at random times or periodically.

6. The LIDAR system of claim 1, wherein the optical switch is configured to send the pulse signal to the amplifier.

7. The LIDAR system of claim 1, wherein the one or more processors are configured to control the optical switch between the enabled state and the disabled state at random times or periodically.

8. The LIDAR system of claim 1, wherein the one or more processors are configured to control an output of the modulator between an enabled state and a disabled state to cause the modulator to generate a pulse signal based on the modulated optical signal.

9. The LIDAR system of claim 8, wherein the one or more processors are configured to control the output of the modulator between the enabled state and the disabled state at random times or periodically.

10. An autonomous vehicle control system comprising one or more processors, wherein the one or more processors are configured to:
   cause a laser source to provide an optical signal at a first signal power;
   cause a modulator to modulate the optical signal from the laser source to generate a modulated optical signal;
   cause an amplifier to amplify the modulated optical signal at a plurality of gain levels;
   based on the first signal power and a duty cycle of the optical signal, vary a gain level of the amplifier from the plurality of gain levels to generate an amplified pulse signal;
   transmit the amplified pulse signal from the amplifier to an environment;
   receive a reflected signal that is reflected from an object, responsive to transmitting the amplified pulse signal;
   determine a range to the object based on an electrical signal associated with the reflected signal; and
   control an optical switch between an enabled state and a disabled state to cause the optical switch to generate a pulse signal based on the modulated optical signal, wherein the optical switch is coupled between the modulator and the amplifier.

11. The autonomous vehicle control system of claim 10, wherein the one or more processors are configured to:

determine a second signal power based on the first signal power and the duty cycle of the optical signal, and cause the amplifier to generate the amplified pulse signal at the second signal power.

12. The autonomous vehicle control system of claim 11, wherein the second signal power is different from the first signal power.

13. The autonomous vehicle control system of claim 10, wherein the one or more processors are configured to vary the gain level of the amplifier at random times or periodically.

14. The autonomous vehicle control system of claim 10, wherein the one or more processors are configured to cause the optical switch to send the pulse signal to the amplifier.

15. The autonomous vehicle control system of claim 10, wherein the one or more processors are configured to control the optical switch between the enabled state and the disabled state at random times or periodically.

16. The autonomous vehicle control system of claim 10, wherein the one or more processors are configured to control an output of the modulator between an enabled state and a disabled state to cause the modulator to generate a pulse signal based on the modulated optical signal.

17. The autonomous vehicle control system of claim 16, wherein the one or more processors are configured to control the output of the modulator between the enabled state and the disabled state at random times or periodically.

18. A autonomous vehicle, comprising:
   a light detection and ranging (LIDAR) system including:
      a laser source configured to provide an optical signal at a first signal power;
      a modulator configured to modulate the optical signal from the laser source to generate a modulated optical signal;
      an amplifier having a plurality of gain levels, at which the amplifier is configured to amplify the modulated optical signal; and
      one or more processors configured to:
         based on the first signal power and a duty cycle of the optical signal, vary a gain level of the amplifier from the plurality of gain levels to generate an amplified pulse signal,
         transmit the amplified pulse signal from the amplifier to an environment,
         receive a reflected signal that is reflected from an object, responsive to transmitting the amplified pulse signal, and
         determine a range to the object based on an electrical signal associated with the reflected signal;
      an optical switch coupled between the modulator and the amplifier, wherein the one or more processors are configured to control the optical switch between an enabled state and a disabled state to cause the optical switch to generate a pulse signal based on the modulated optical signal;
   at least one of a steering system or a braking system; and
   a vehicle controller comprising one or more processors configured to control operation of the at least one of the steering system or the braking system based on the range to the object.

* * * * *